(12) United States Patent
Pinarbasi

(10) Patent No.: US 6,783,635 B2
(45) Date of Patent: Aug. 31, 2004

(54) SPIN VALVE SENSOR FREE LAYER STRUCTURE WITH A COBALT BASED LAYER THAT PROMOTES MAGNETIC STABILITY AND HIGH MAGNETORESISTANCE

(75) Inventor: Mustafa Pinarbasi, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/458,581

(22) Filed: Dec. 9, 1999

(65) Prior Publication Data

US 2003/0086217 A1 May 8, 2003

(51) Int. Cl.[7] ............................................... C23C 14/34
(52) U.S. Cl. .............................. 204/192.11; 204/298.04
(58) Field of Search ....................... 204/298.04, 192.11

(56) References Cited

U.S. PATENT DOCUMENTS

| | | | |
|---|---|---|---|
| 4,315,960 A | 2/1982 | Ohji et al. | 427/248.1 |
| 4,923,585 A | 5/1990 | Krauss et al. | 204/298.04 |
| 5,206,590 A | 4/1993 | Dieny et al. | 324/252 |
| 5,330,628 A | 7/1994 | Demaray et al. | 204/192.12 |
| 5,341,261 A | 8/1994 | Dieny et al. | 360/113 |
| 5,393,398 A | 2/1995 | Sugano | 204/298.11 |
| 5,492,605 A * | 2/1996 | Pinarbasi | 204/192.11 |
| 5,598,308 A | 1/1997 | Dieny et al. | 360/113 |
| 5,616,370 A * | 4/1997 | Okuno et al. | 427/547 |
| 5,766,743 A * | 6/1998 | Fujikata et al. | 428/212 |
| 5,768,071 A * | 6/1998 | Lin | 360/113 |
| 5,962,080 A * | 10/1999 | Tan et al. | 427/529 |

FOREIGN PATENT DOCUMENTS

| | | | |
|---|---|---|---|
| JP | 61124568 | 6/1986 | |
| JP | 2097673 | 4/1990 | |
| JP | 02-251143 | 10/1990 | ........... H01L/21/31 |
| JP | 3-202466 | 4/1991 | ............ G11B/5/85 |
| JP | 4-308083 | 10/1992 | |
| WO | WO 92/16014 | 9/1992 | |

* cited by examiner

Primary Examiner—Rodney G. McDonald
(74) Attorney, Agent, or Firm—Ervin F. Johnston

(57) ABSTRACT

A method of making a nickel iron (NiFe) layer and a cobalt or cobalt based layer of a free layer structure forms the cobalt or cobalt based layer by oblique ion beam sputter deposition with the cobalt or cobalt based layer located between the nickel iron (NiFe) layer and a copper (Cu) spacer layer of a spin valve sensor for reducing hard axis coercivity $H_{CH}$ which increases sensitivity and magnetic stability of a magnetic read head. An alpha iron oxide (αFeO) layer on a nickel oxide (NiO) layer of a pinning layer may also be obliquely ion beam sputtered for improving magnetic stability of the read head.

51 Claims, 21 Drawing Sheets

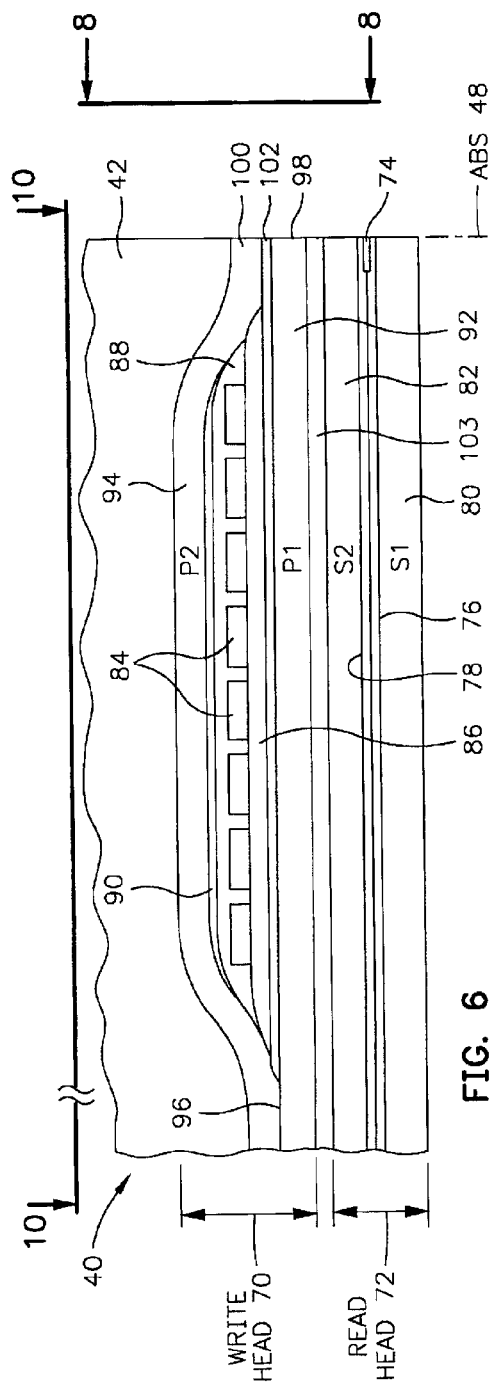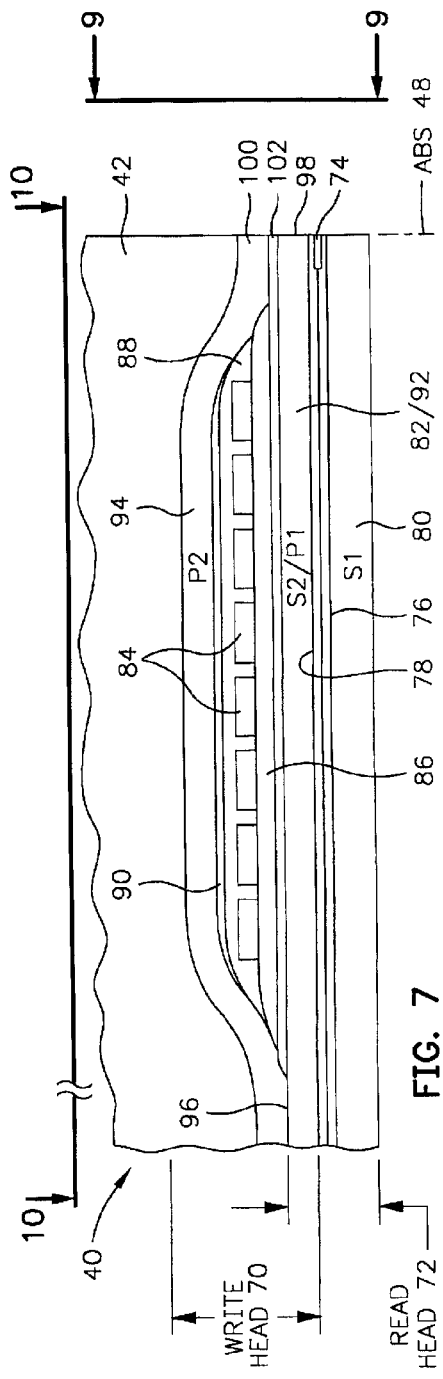
FIG. 6
FIG. 7

(ABS)

SPIN VALVE SENSOR FREE LAYER STRUCTURE WITH A COBALT BASED LAYER THAT PROMOTES MAGNETIC STABILITY AND HIGH MAGNETORESISTANCE

BACKGROUND OF THE INVENTION

1. Field of the Invention

The present invention relates to a spin valve sensor free layer structure with a cobalt based layer that promotes magnetic stability and high magnetoresistance.

2. Description of the Related Art

The heart of a computer is an assembly that is referred to as a magnetic disk drive. The magnetic disk drive includes a rotating magnetic disk, a slider that has read and write heads, a suspension arm above the rotating disk and an actuator that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a nonmagnetic gap layer at an air bearing surface (ABS) of the write head. The pole piece layers are connected at a back gap. Current conducted to the coil layer induces a magnetic field into the pole pieces that fringes across the gap between the pole pieces at the ABS. The fringe field writes information in the form of magnetic impressions in circular tracks on the rotating disk.

An exemplary high performance read head employs a spin valve sensor for sensing magnetic signal fields from the rotating magnetic disk. The sensor includes a nonmagnetic electrically conductive first spacer layer sandwiched between a ferromagnetic pinned layer and a ferromagnetic free layer. An antiferromagnetic pinning layer interfaces the pinned layer for pinning the magnetic moment of the pinned layer 90° to an air bearing surface (ABS) which is an exposed surface of the sensor that faces the rotating disk. First and second leads are connected to the spin valve sensor for conducting a sense current therethrough. A magnetic moment of the free layer is free to rotate upwardly and downwardly with respect to the ABS from a quiescent or zero bias point position in response to positive and negative magnetic signal fields from the rotating magnetic disk. The quiescent position of the magnetic moment of the free layer, which is preferably parallel to the ABS, is when the sense current is conducted through the sensor without magnetic field signals from the rotating magnetic disk. If the quiescent position of the magnetic moment is not parallel to the ABS the positive and negative responses of the free layer will not be equal which results in read signal asymmetry which is discussed in more detail hereinbelow.

The thickness of the spacer layer is chosen so that shunting of the sense current and a magnetic coupling between the free and pinned layers are minimized. This thickness is typically less than the mean free path of electrons conducted through the sensor. With this arrangement, a portion of the conduction electrons is scattered by the interfaces of the spacer layer with the pinned and free layers. When the magnetic moments of the pinned and free layers are parallel with respect to one another scattering is minimal and when their magnetic moments are antiparallel scattering is maximized. An increase in scattering of conduction electrons increases the resistance of the spin valve sensor and a decrease in scattering of the conduction electrons decreases the resistance of the spin valve sensor. Changes in resistance of the spin valve sensor is a function of $\cos \theta$, where $\theta$ is the angle between the magnetic moments of the pinned and free layers.

The sensitivity of the sensor is quantified as magnetoresistance or magnetoresistive coefficient dr/R where dr is the change in resistance of the spin valve sensor from minimum resistance (magnetic moments of free and pinned layers parallel) to maximum resistance (magnetic moments of the free and pinned layers antiparallel) and R is the resistance of the spin valve sensor at minimum resistance. A spin valve sensor is sometimes referred to as a giant magnetoresistive (GMR) sensor. The sensitivity of a spin valve sensor depends upon the response of the free layer to signal fields from a rotating magnetic disk. The magnetic moment of the free layer or free layer structure depends upon the material or materials employed for the free layer structure. As the magnetic moment of the free layer structure increases the responsiveness of the free layer structure decreases. This means that for a given field signal from the rotating magnetic disk the magnetic moment of the free layer structure will not rotate as far from its parallel position to the ABS which causes a reduction in signal output.

In order to improve the sensitivity of the spin valve sensor a soft magnetic material, such as nickel iron (NiFe), is employed. It has been found, however, that when the free layer structure employs a cobalt based layer in addition to the nickel iron (NiFe) layer that the magnetoresistive coefficient dr/R increases when the cobalt based layer is located between and interfaces the nickel iron (NiFe) layer and the copper (Cu) spacer layer. A cobalt based layer, such as cobalt (Co) or cobalt iron (CoFe), has a magnetic moment of approximately 1.7 times the magnetic moment of nickel iron (NiFe) for a given thickness. The addition of a cobalt or cobalt based layer increases the stiffness of the free layer structure in its response to field signals and reduces the sensitivity of the spin valve sensor. Further, the cobalt based material causes the free layer structure to have a hysteresis. This hysteresis is indicated in a hysteresis loop which is a graph of the magnetic moment M of the free layer structure in response to an applied field H (signal field) directed perpendicular to the easy axis of the free layer structure. The hysteresis loop, which is referred to as the hard axis loop, has an opening due to the hysteresis which can be on the order of 5 to 7 oersteds. The opening in the hard axis loop is quantified as hard axis coercivity $H_C$ which is measured from the origin of the x and y axes to the intersection of the loop with the x axis (applied signal). It has been found that when the hard axis coercivity is high the head generates Barkhausen noise which is due to the fact that the magnetic domains of the cobalt based layer are oriented in different directions. Accordingly, as the signal fields rotate the magnetic moment of the free layer structure some of the magnetic domains do not follow the directions of the signal fields. The magnetic domains that do not readily follow the signal field direction follow behind the signal field direction in an erratic behavior, referred to as jumps in their movements, which causes the aforementioned Barkhausen noise. This Barkhausen noise is superimposed upon the playback signal which is unacceptable.

In order to keep the hard axis coercivity at an acceptable low level, only very thin cobalt based layers can be employed, such as 2 Å thick. While a 2 Å thick cobalt based layer produces some improvement in the magnetoresistive coefficient dr/R, it has been found that thicker cobalt based layers will further increase the magnetoresistive coefficient dr/R. Considering all factors, including sense current shunting, a cobalt based layer on the order of 15 Å produces the highest magnetoresistive coefficient dr/R. Unfortunately, a cobalt based layer of this thickness causes the free layer structure to have a hard axis coercivity which unacceptably reduces the sensitivity of the read head to signal fields and produces Barkhausen noise. Accordingly, it would be desirable if cobalt based layers thicker than 2 Å could be employed in a free layer structure without the aforementioned problems of responsiveness to signal fields and the production of Barkhausen noise. If the hysteresis or opening in the hard axis loop could be eliminated the aforementioned moment versus applied field graph (M/H graph) of the responsiveness of the spin valve sensor would be simply a straight line. This straight line indicates that the read head will be magnetically stable upon the application of the signal fields.

Another factor affecting the magnetic stability, not involving Barkhausen noise, is the magnetic stability of the pinning layer. A typical pinning layer is nickel oxide (NiO) which pins a magnetic moment of the pinned layer structure. Nickel oxide (NiO) has a blocking temperature of about 220° C. wherein the blocking temperature is the temperature at which all of the magnetic spins of the nickel oxide (NiO) pinning layer are free to move in response to an applied field. Unfortunately, there is a blocking temperature distribution wherein some of the magnetic spins of the nickel oxide (NiO) pinning layer are free to move at temperatures below 220° C. The operating temperature in a magnetic disk drive is anywhere between 80° C. to 120° C. Should the read head be further heated due to striking an asperity on the rotating magnetic disk or be subjected to an electrostatic discharge (ESD) the temperature of the read head may rise sufficiently so that an unwanted magnetic field may rotate the pinned layer causing some of the magnetic spins of the nickel oxide (NiO) pinning layer to rotate. When this occurs the nickel oxide (NiO) may not be sufficiently strong (exchange coupling field) to return the magnetic moment of the pinned layer to its original orientation perpendicular to the ABS. This will cause a loss of amplitude and increase asymmetry of the playback signals. Accordingly, it would be desirable if the blocking temperature distribution of the nickel oxide (NiO) and/or an alpha α iron oxide layer associated therewith could be narrowed so as to improve the magnetic stability of the pinning layer.

In a read head application the hard axis loop or curve of the free layer structure has to be determined after the free layer is subjected to annealing at a high temperature for a period of time. This is due to the fact that during the fabrication of a read/write head combination the aforementioned first, second and third insulation layers are baked photoresist. After spinning a photoresist layer onto a wafer substrate and patterning it, the photoresist layer is annealed at a temperature of approximately 220° C. for a period of 6 hours. Accordingly, the hard axis loop or curve for a free layer structure in a read head that is combined with a write head has meaning only after this annealing.

SUMMARY OF THE INVENTION

I have found that by obliquely ion beam sputtering the cobalt based layer of the free layer structure that the hard axis coercivity can be reduced. I have further found that annealing during the hard back cycle of the insulation layers of the write head further reduces the hard axis coercivity to virtually zero. Ion beam sputtering is accomplished within a chamber which has a substrate where the spin valve sensor is to be fabricated and a target which has the material to be sputtered. An ion beam gun directs ionized gas onto the target which causes the target to sputter atoms of the material toward the substrate. In oblique ion beam sputter deposition the surface planes of the substrate and the target are at an angle with respect to one another. Accordingly, oblique ion beam sputter deposition improves the magnetic stability of a free layer structure having a cobalt based layer which is still further improved by annealing. In an exemplary embodiment the free layer structure may include a nickel iron (NiFe) layer which is sandwiched between first and second cobalt based layers wherein the first cobalt based layer interfaces the copper spacer layer as discussed hereinabove. The second cobalt based layer still further increases the magnetoresistive coefficient dr/R. It is preferred that all three of these layers be obliquely ion beam sputtered.

I have also employed the oblique ion beam sputter deposition process for improving the magnetic stability of a pinning layer structure that employs a first layer of nickel oxide (NiO) and a second layer of alpha α iron oxide. While in a preferred embodiment the oblique ion beam sputtering is employed for depositing both of these layers the sputtering may be employed for depositing only one of the layers. The result is that the blocking temperature distribution is decreased so that the pinning layer structure is more stable when the pinned layer is subjected to a field transverse to its pinned direction in the presence of heat.

An object of the present invention is to provide a spin valve sensor for a read head which has improved magnetic stability.

Another object is to provide a free layer structure with a cobalt or cobalt based layer in a spin valve sensor which promotes an increase in magnetoresistance with virtually no hard axis coercivity.

A further object is to provide a highly magnetically stable spin valve sensor that employs one or more cobalt or cobalt based layers in a free layer structure and a pinning layer structure which includes nickel oxide (NiO) and alpha α iron oxide layers.

Still a further object is to provide a spin valve sensor with a pinning layer structure of nickel oxide (NiO) and alpha α iron oxide that has an improved blocking temperature distribution.

Still another object is to provide various methods of making the aforementioned spin valve sensors.

Other objects and advantages of the invention will become apparent upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

DESCRIPTION OF THE PREFERRED EMBODIMENTS

Magnetic Disk Drive

Figure 1:
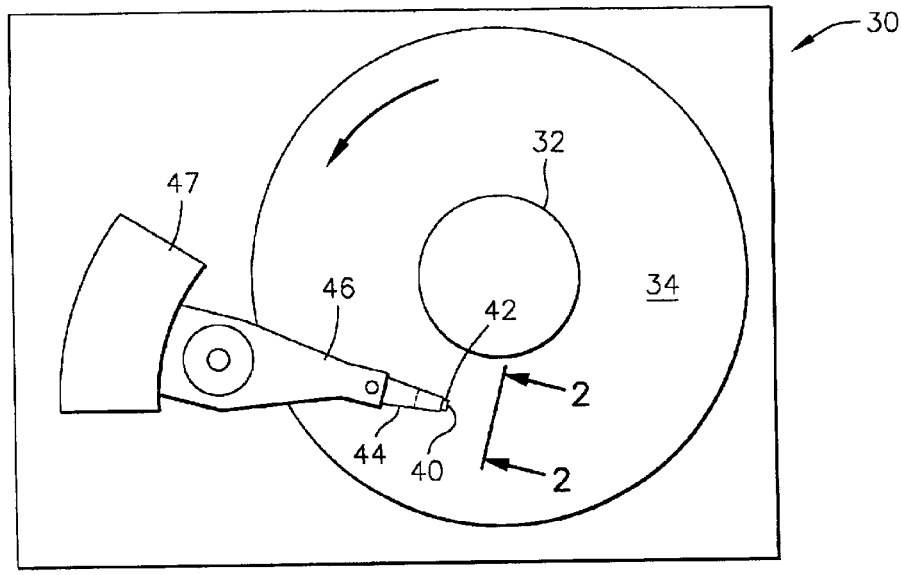
FIG. 1 is a plan view of an exemplary magnetic disk drive.
Figure 2:
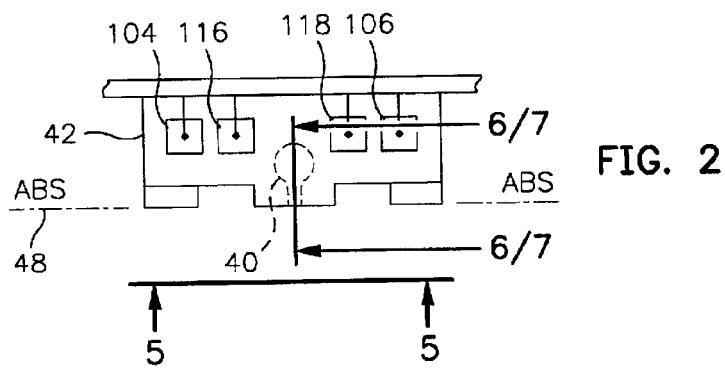
FIG. 2 is an end view of a slider with a magnetic head of the disk drive as seen in plane 2—2.
Figure 3:
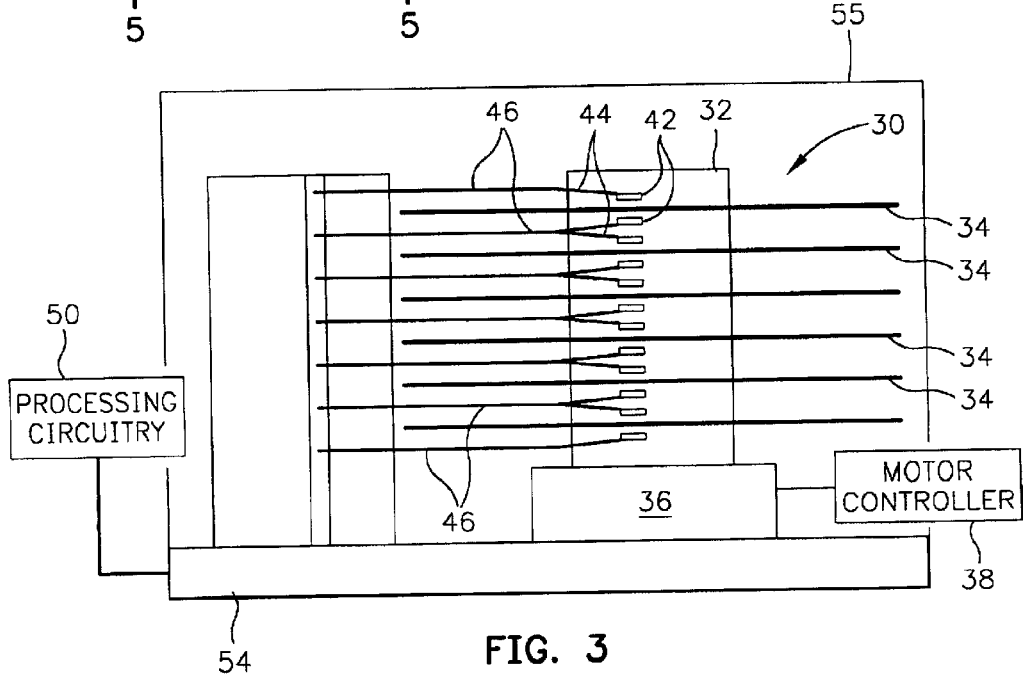
FIG. 3 is an elevation view of the magnetic disk drive wherein multiple disks and magnetic heads are employed.
Figure 4:
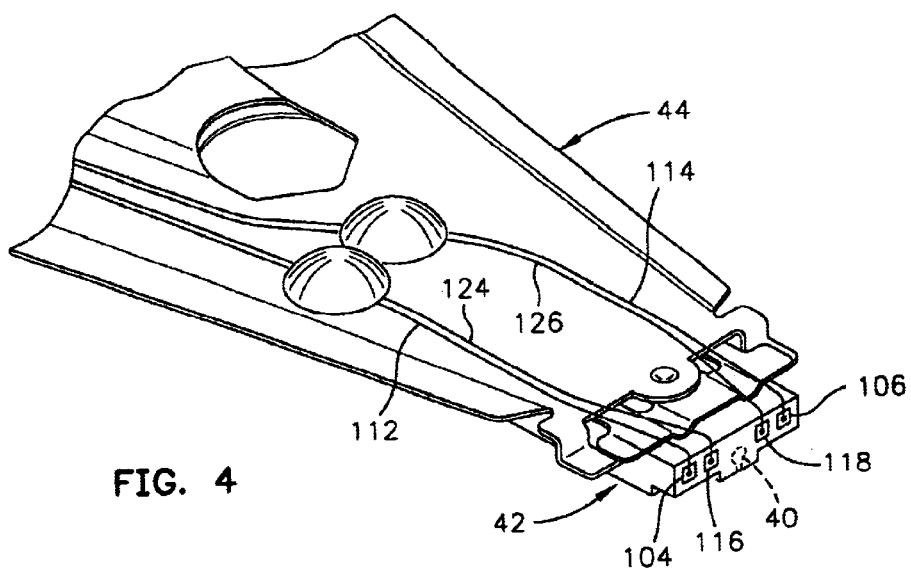
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing, as shown in FIG. 3.

Figure 5:
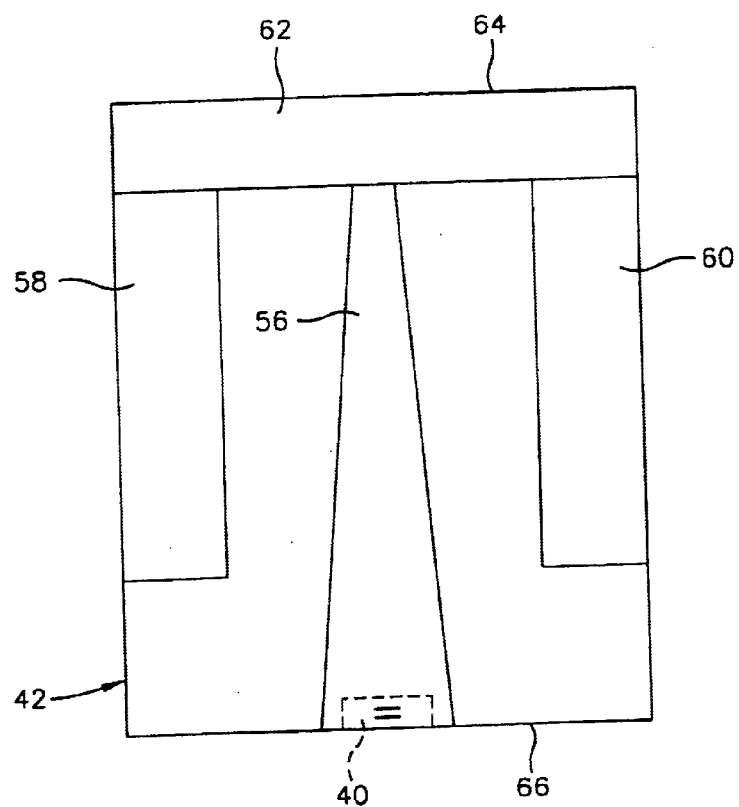
FIG. 5 is an ABS view of the magnetic head taken along plane 5—5 of FIG. 2.
Figure 10:
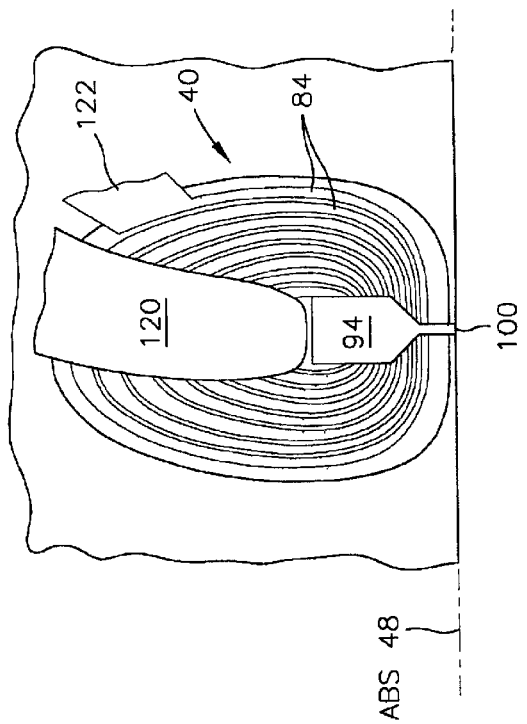
FIG. 10 is a view taken along plane 10—10 of FIG. 6 or 7 with all material above the coil layer and leads removed.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
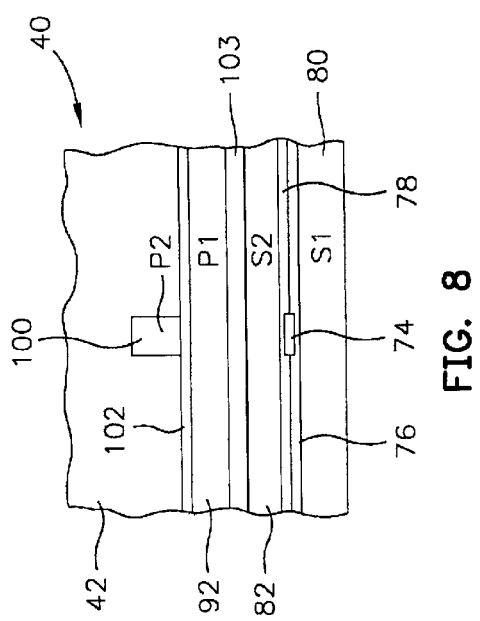
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
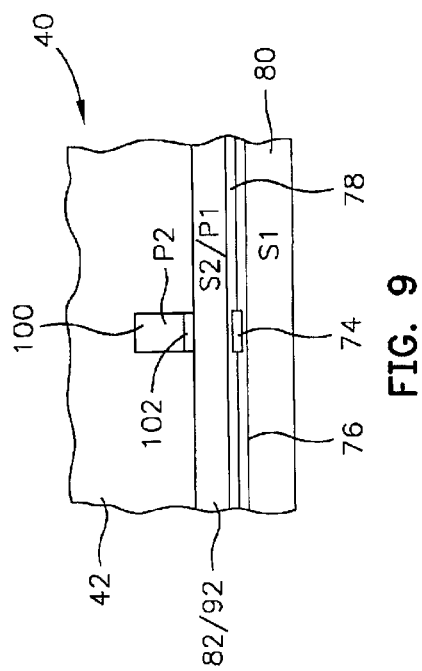
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
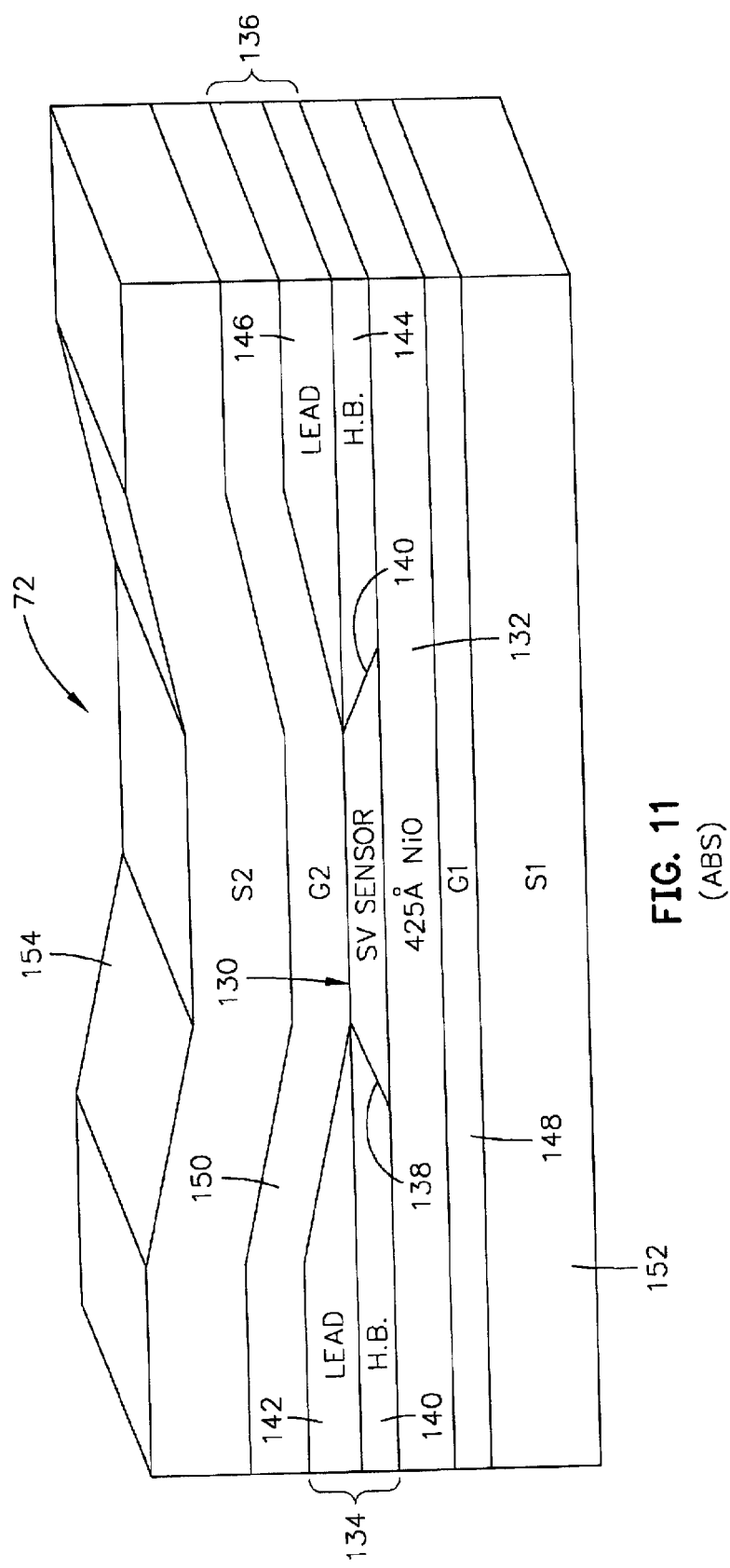
FIG. 11 is an isometric ABS illustration of a read head which employs an AP pinned spin valve (SV) sensor.

FIG. 11 is an isometric ABS illustration of the read head 72 shown in FIGS. 6 or 8. The read head 72 includes the present spin valve sensor 130 which is located on an antiferromagnetic (AFM) pinning layer 132. A ferromagnetic pinned layer in the spin valve sensor 130, which is to be described hereinafter, is pinned by the magnetic spins of the pinning layer 132. The AFM pinning layer may be 425 Å of nickel oxide (NiO). First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 130 for stabilizing the magnetic domains therein. The AFM pinning layer 132, the spin valve sensor 130 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

Figure 12:
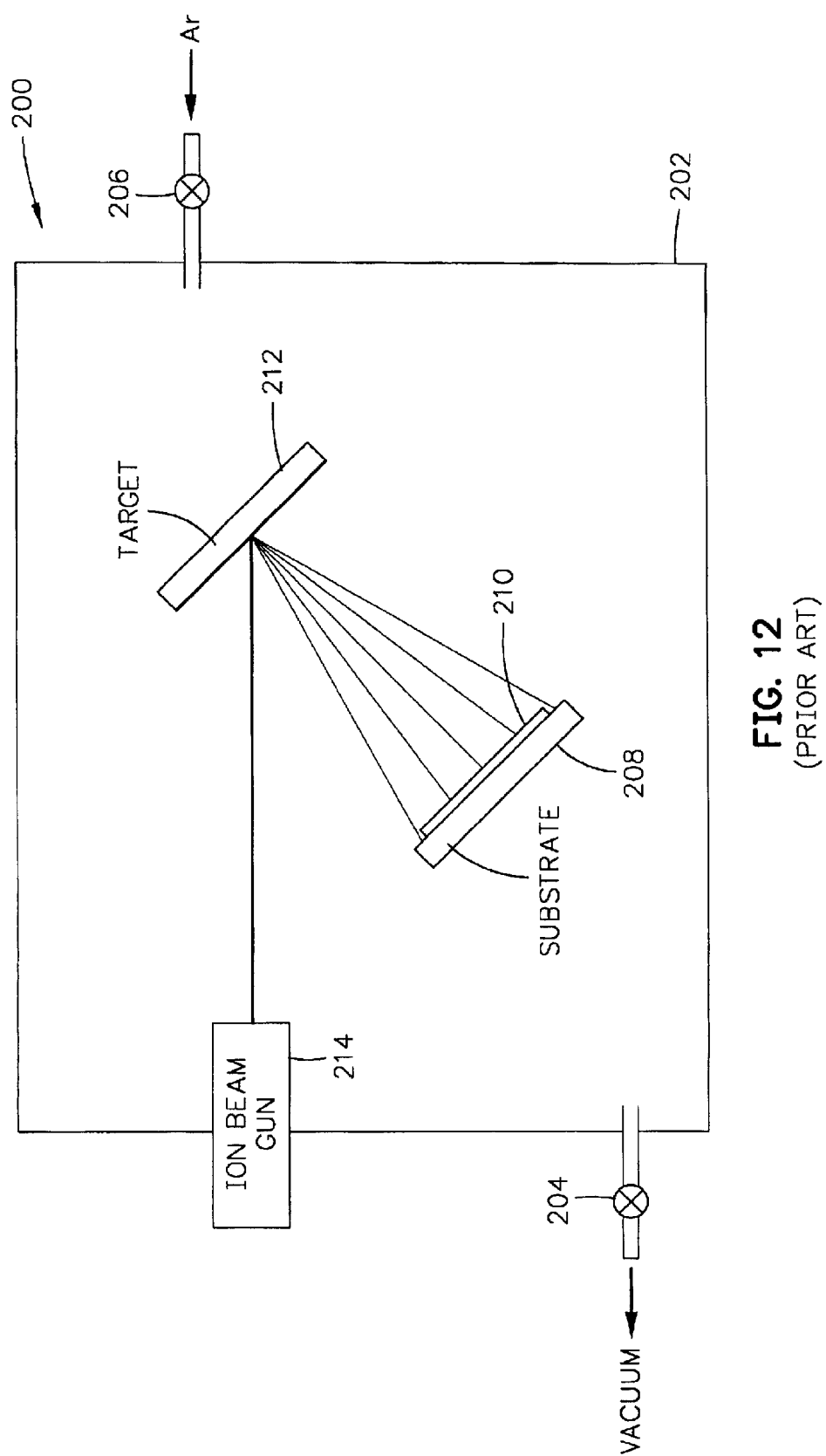
FIG. 12 is a schematic illustration of a prior art ion beam sputtering chamber wherein surface planes of the substrate and the target are parallel with respect to one another.

An exemplary prior art sputtering system 200 which may be employed for forming layers of a read head is shown in FIG. 12. The sputtering system 200 includes a chamber 202 which has a valve controlled outlet 204 and a valve controlled inlet 206. The outlet 204 is for the purpose of drawing a vacuum in the chamber and the inlet 206 is for the purpose of introducing an inert gas, such as Argon (Ar), into the chamber. Mounted within the chamber is a substrate 208 which supports a wafer 210 upon which layers of the read head are formed. Opposite the wafer and substrate is a target 212 composed of the material to be sputter deposited on the wafer 210. An ion beam gun 214 is mounted at one end of the chamber 202 for the purpose of directing a beam of ions onto the target 212. Within the ion beam gun high energy electrons collide with atoms, such as argon (Ar) or xenon (Xe) atoms, knocking out one of the electrons of each atom causing atoms to be ionized with a positive charge. Electrons knocked out of the atoms have high energy which knock out additional electrons from other atoms which creates a plasma within the ion beam gun 214. Ionized atoms from the ion beam gun strike the target 212 which causes the material of the target to be sputtered and deposited on the wafer 210. In the sputtering system 200 the nominal planes of the substrate 208 and the target 212 are substantially parallel with respect to one another. When the nominal planes are parallel this results in non-oblique sputtering of atoms onto the substrate.

Figure 13:
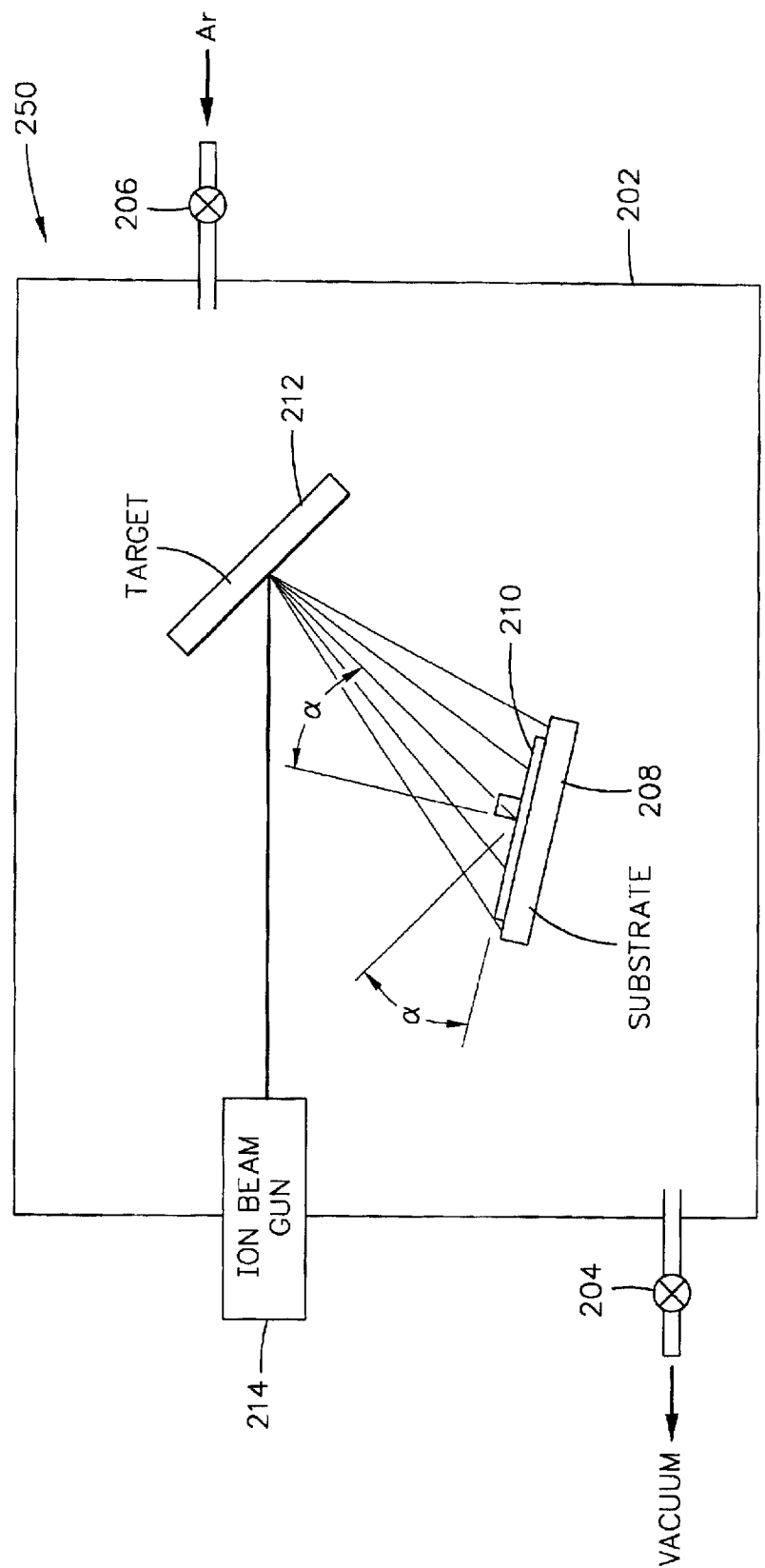
FIG. 13 illustrates an oblique ion beam sputtering chamber which is the same as the sputtering chamber in FIG. 12 except the surface planes of the substrate and the target are at an angle with respect to one another for implementing oblique ion beam deposition on the substrate.

A sputtering system 250 employed in the present invention is shown in FIG. 13. The sputtering chamber 250 is the same as the sputtering chamber 200 except for the angle of the substrate 208 and the wafer 210. The nominal surface planes of the substrate 208 and the target 212 are oriented at a substrate/target angle $\alpha$ with respect to one another instead of being parallel with respect to one another as shown in FIG. 12. With this arrangement atoms of the material sputtered from the target 212 are deposited on the wafer 210 at a sputtering angle $\alpha$ to a normal to the nominal surface plane of the substrate 208. While the substrate/target or sputtering angle $\alpha$ is shown in the plane of the paper, angle $\alpha$ can be located at any angle within 360° commencing with the plane of the paper and rotated into and out of the paper back to the plane of the paper which will be described in more detail hereinafter. The chamber pressure can be $10^{-4}$ torr and the working gas may be argon (Ar), krypton (Kr) or xenon (Xe).

Figure 14:
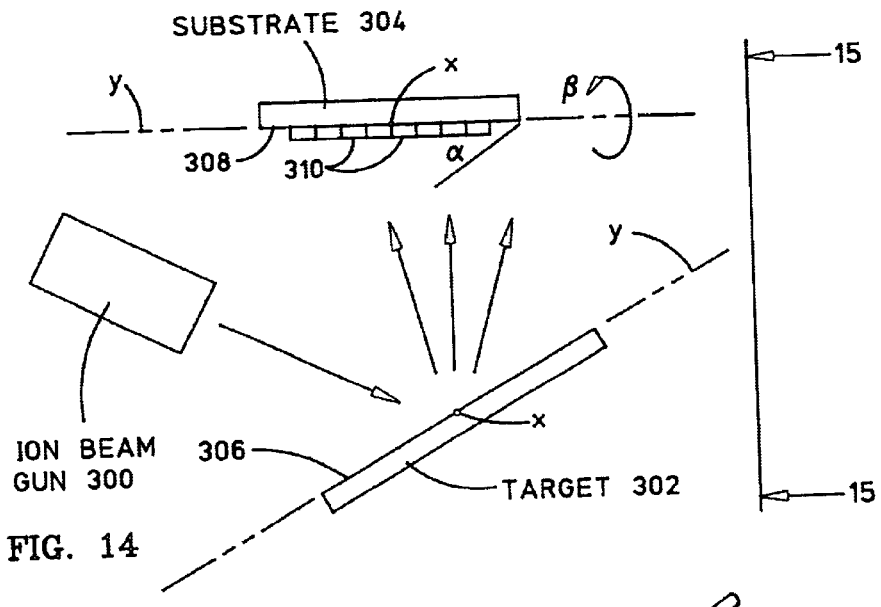
FIG. 14 is a schematic illustration of an ion beam gun, target and substrate with the substrate rotated by angle α with respect to the target.
Figure 15A:
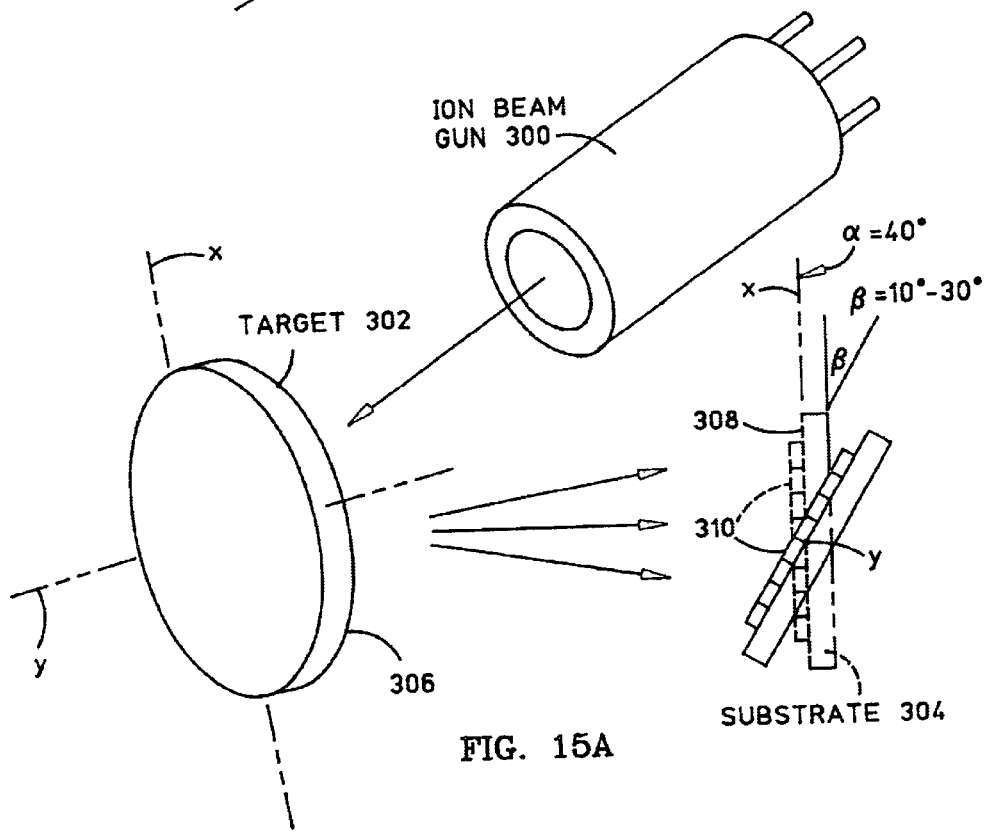
FIG. 15A is a perspective view looking from the right of and partially down on FIG. 14 with the ion beam gun enlarged and with the substrate rotated by angle β in addition to angle α.
Figure 15B:
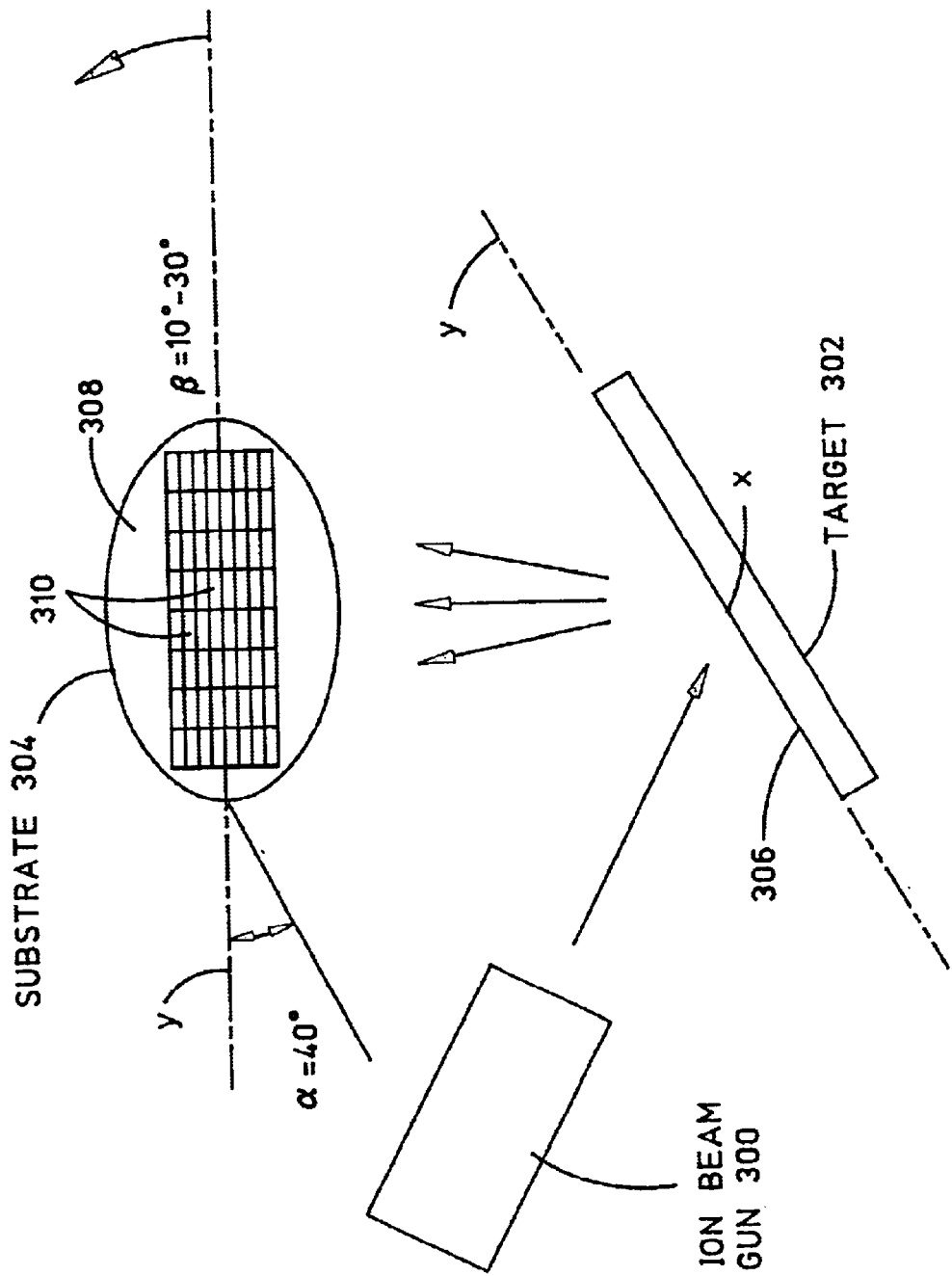
FIG. 15B is the same as FIG. 14 except the substrate has been rotated by angle β.

FIGS. 14 and 15 schematic diagrams of an ion beam gun 300, a target 302 of some metal and a substrate 304 to illustrate how a substrate/target angle or sputtering angle may comprise rotating one or both of the target 302 and the substrate 304 about one or both of x and y axes within nominal surface planes 306 and 308 respectively by various angles $\alpha$ and $\beta$ in order to achieve a non-parallel relationship between the target and the substrate for the purpose of achieving oblique ion beam sputtering of the metal onto the substrate 304 with a reduced density. Either angle $\alpha$ or $\beta$ or a combination of the angles results in oblique ion beam sputtering (non-normal flux flow) from the center of the target to the center of the substrate. Either the target 302 or the substrate 304 may be maintained stationary while the other is rotated by angles $\alpha$ and/or $\beta$ to achieve a non-parallel relationship therebetween as shown in FIGS. 14 and 15. As an example, FIG. 14 shows the substrate 304 rotated by an angle $\alpha$ about the x axis and FIGS. 15A and 15B show the substrate rotated by an angle $\alpha$ about the x axis and by an angle $\beta$ about the y axis. Accordingly, the substrate/target angle or sputtering angle comprises angles $\alpha$ and $\beta$ wherein the planes formed by these angles are orthogonal with respect to one another. As shown in FIGS. 15A and 15B and as described in examples hereinabove $\alpha$ may be 40° and $\beta$ may be in a range of 10°–30°. Alternatively, or in addition, the substrate/target angle or sputtering angle may comprise rotating the target 302 about one or both of the x and y axes on its nominal surface plane 306. FIGS. 14, 15A and 15B show rows and columns of magnetic heads 310 being formed on the substrate 304 with the novel free layer structures of the present invention. Various layers for the read head are shown in FIG. 11 and various layers for the write head are shown in FIGS. 6–10.

Seven examples are set forth hereinbelow for explaining and describing the present invention. The first three examples show various ion beam sputter deposition techniques for the purpose of determining whether oblique ion beam sputter deposition affects the magnetoresistive coefficient dr/R of the spin valve sensor. The last four examples employ different sputter deposition techniques with M/H graphs showing the results. In all examples the angle α was 40°.

EXAMPLE 1

Figure 16:
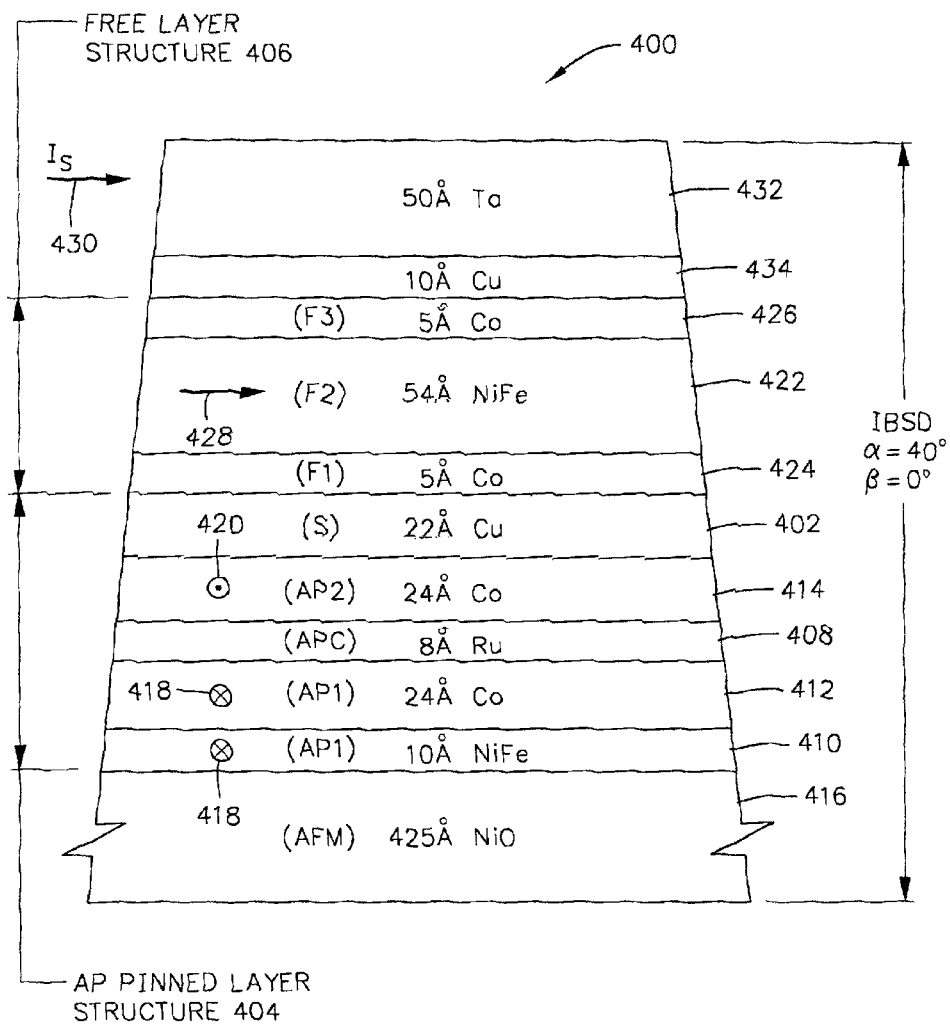
FIG. 16 is an ABS illustration of a first example of a spin valve sensor.

A first example of a spin valve sensor 400 is shown in FIG. 16 which includes a nonmagnetic electrically conductive spacer layer 402 located between an antiparallel (AP) pinned layer structure 404 and a free layer structure 406. The AP pinned layer structure 404 includes an antiparallel coupling (APC) layer 408 which is located between first and second antiparallel layers (AP1) and (AP2) wherein the first AP pinned layer includes first and second films 410 and 412 and the second AP pinned layer is a single layer 414. A pinning layer 416 pins a magnetic moment 418 of the first AP pinned layer (AP1) 410 which, in turn, by a strong antiparallel coupling, pins a magnetic moment 420 of the second AP pinned layer (AP2) 414 antiparallel thereto. Magnetic moments 418 and 420 are directed perpendicular to the ABS in a direction either toward or away from the ABS. The free layer structure 406 has a middle layer 422 which is located between first and second outside layers 414 and 426. The free layer structure 406 has a magnetic moment 428 which is directed parallel to the ABS and rotates upwardly or downwardly in response to signal fields from a rotating magnetic disk. When a signal field rotates the magnetic moment 428 upwardly the resistance of the spin valve sensor increases and when the signal field rotates the magnetic moment 428 downwardly the resistance of the spin valve sensor decreases so that when the sense current Is 430 is conducted through the spin valve sensor potential changes due to the resistance changes are processed by the processing circuitry 50 as playback signals. A cap layer 432 is located on the sensor with an intermediate layer 434 located between the cap layer and the top layer 426 of the free layer structure.

The thicknesses and materials of the layers of the spin valve sensor are 425 Å of nickel oxide (NiO) for the pinning layer 416, 10 Å of nickel iron (NiFe) for the first layer 410, 24 Å of cobalt (Co) for the second layer 412, 8 Å of ruthenium (Ru) for the antiparallel coupling layer 48, 24 Å of cobalt (Co) for the second AP pinned layer 414, 22 Å of copper (Cu) for the spacer layer 402, 5 Å of cobalt (Co) for the bottom free layer 424, 54 Å of nickel iron (NiFe) for the middle layer 422, 5 Å of cobalt (Co) for the top free layer 426, 10 Å of copper (Cu) for the intermediate layer 434 and 50 Å of tantalum for the cap layer 432.

All of the layers of the spin valve sensor 400 were formed by ion beam sputter deposition (IBSD) with sputtering angle α=40° and sputtering angle if β=0°. Upon conducting tests on the spin valve sensor 400 it was found that the magnetoresistive coefficient dr/R of the spin valve sensor was 6.33%, the ferromagnetic coupling field $H_F$ was −0.42 Oe and the resistance R was 15.82 ohms/sq. The next two examples were run for the purpose of comparing the magnetoresistive coefficients dr/R with the magnetoresistive coefficient dr/R of Example 1.

EXAMPLE 2

Figure 17:
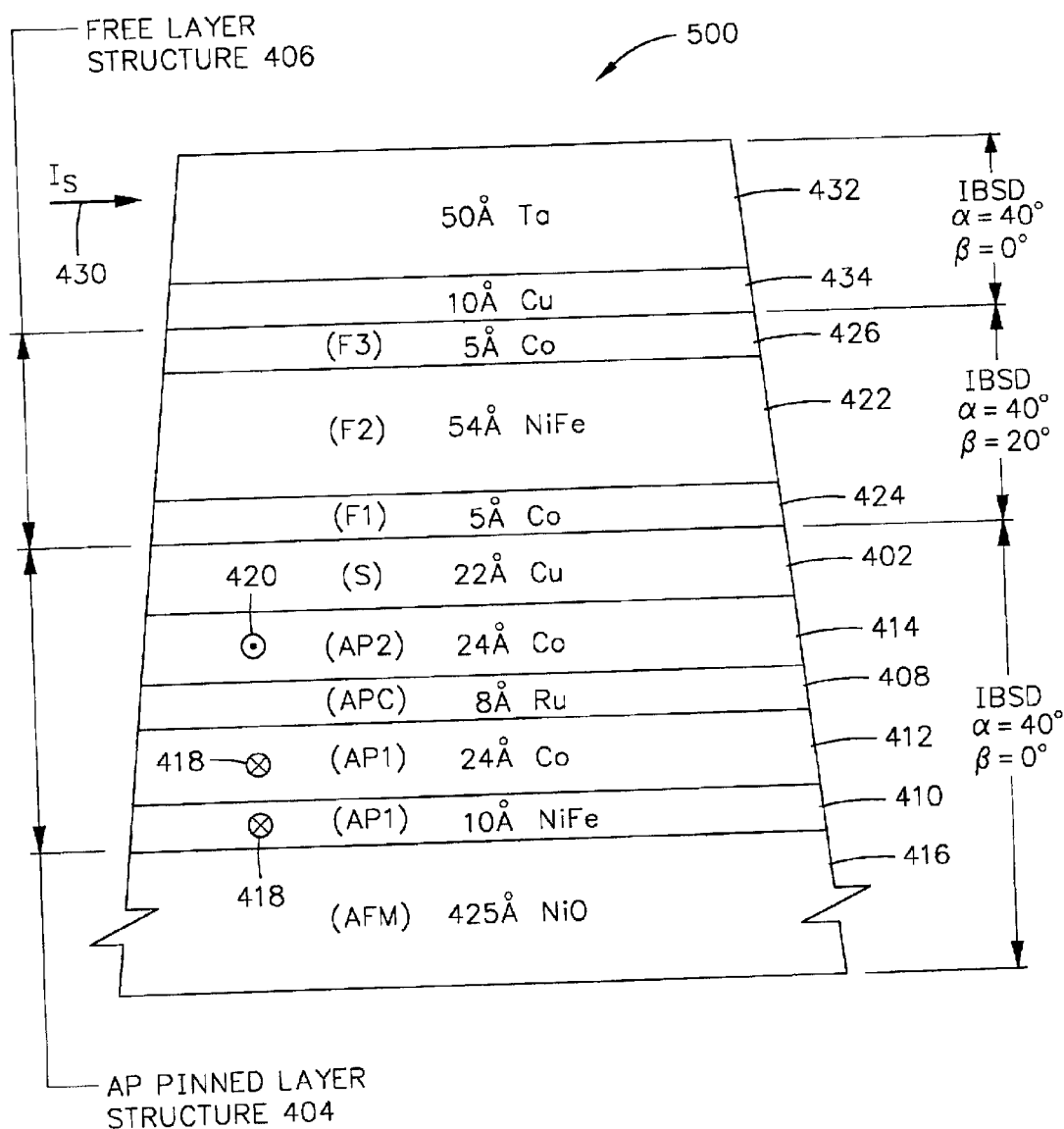
FIG. 17 is an ABS illustration of a second example of a spin valve sensor.

Example 500, shown in FIG. 17, is the same as Example 400 shown in FIG. 16 except the layers 424, 422 and 426 of the free layer structure 406 were obliquely ion beam sputter deposited at a sputtering angle α=40° and a sputtering angle β=20° while the remainder of the layers were ion beam sputter deposited at a sputtering angle α=40° and sputtering angle β=0° of 90°. After conducting tests the magnetoresistive coefficient dr/R was 6.56%, the ferromagnetic coupling field $H_F$ was 3.54 Oe and the resistance R was 15.70 ohms/sq. It can be seen from this example that the free layer structure resulted in a slight increase in magnetoresistive coefficient dr/R as compared to Example 1. The ferromagnetic coupling field increased to 3.54 Oe which is an acceptable level. The resistance R remained substantially the same. The ferromagnetic coupling field is the field exerted on the free layer structure 406 by the magnetic moment 420 of the second pinned layer. When the ferromagnetic coupling field $H_F$ is negative it will be antiparallel to the magnetic moment 420 and when it is positive it will be parallel to the magnetic moment 420.

EXAMPLE 3

Figure 18:
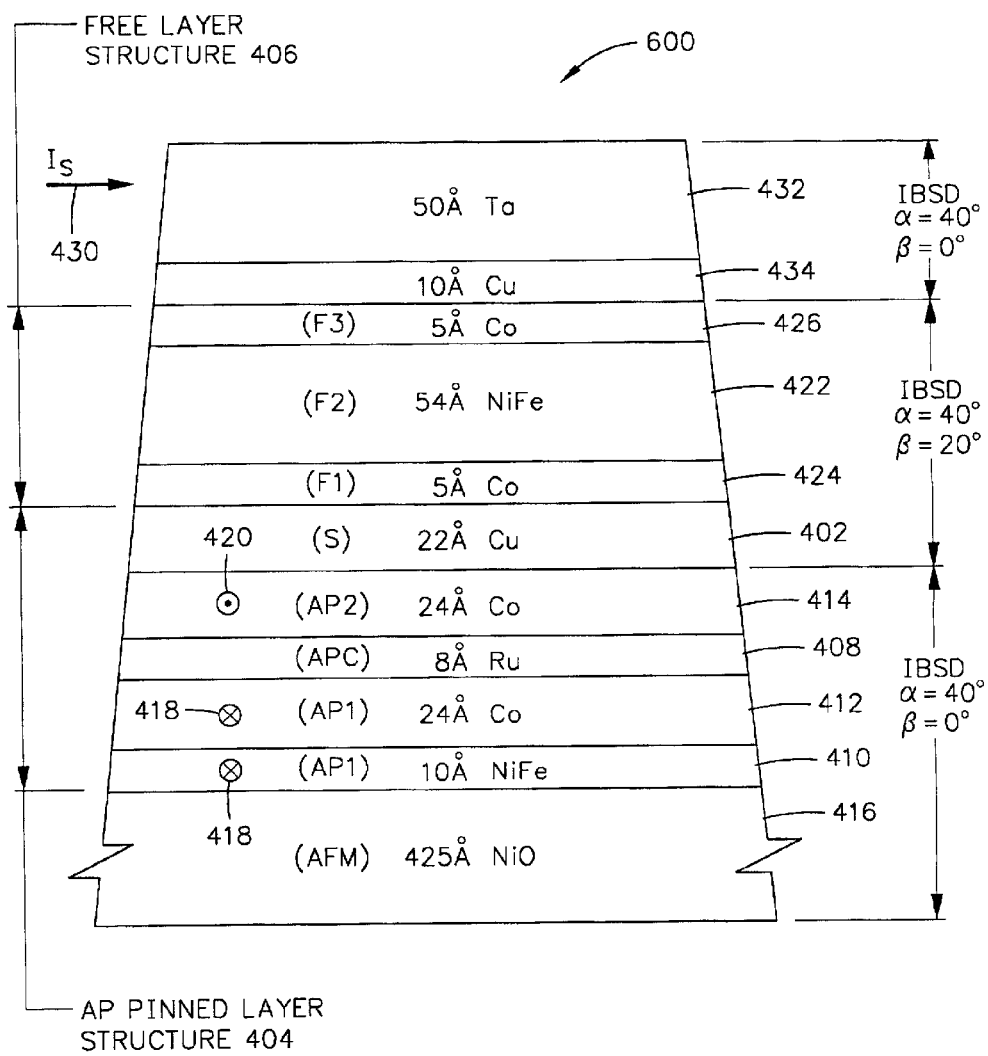
FIG. 18 is an ABS illustration of a third example of a spin valve sensor.

Example 600, shown in FIG. 18, is the same as Example 500 shown in FIG. 17 except in addition to the free layer structure 406 being formed by oblique ion beam sputter deposition the spacer layer 402 is also formed by oblique ion beam sputter deposition with the same angles α and β. Upon conducting tests the magnetoresistive coefficient dr/R was 6.67%, the ferromagnetic coupling field $H_F$ was 10.84 Oe and the resistance R was 15.66 ohms/sq. While the increase in the magnetoresistive coefficient dr/R was desirable the increase in the ferromagnetic coupling field $H_F$ to 10.84 Oe is not desirable when the pinned structure is an antiparallel pinned layer structure 406 as shown in the examples. An AP pinned layer structure has a low net demagnetization field and, when combined with the ferromagnetic coupling field $H_F$ and a net sense current field $H_I$, due to the sense current $I_S$ 430, it becomes difficult to properly bias the magnetic moment 428 of the free layer structure in a parallel position to the ABS when the sensor is in a quiescent state. Accordingly, Example 2 is more desirable than Example 3. However, Examples 2 and 3 show that oblique ion beam sputtering of the free layer structure as well as the spacer layer does not adversely affect the magnetoresistive coefficient dr/R.

EXAMPLE 4

Figure 19:
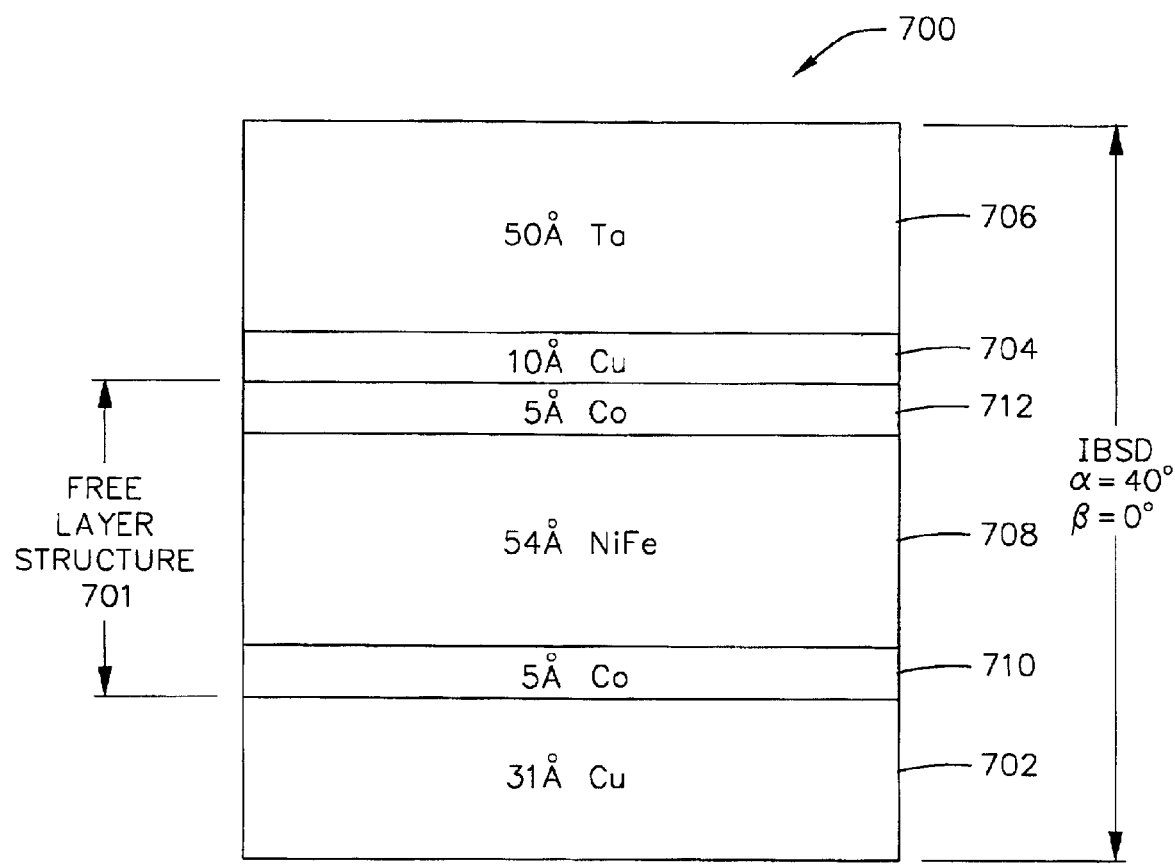
FIG. 19 is an ABS illustration of a first example of a free layer structure sandwiched between additional layers.
Figure 20A:
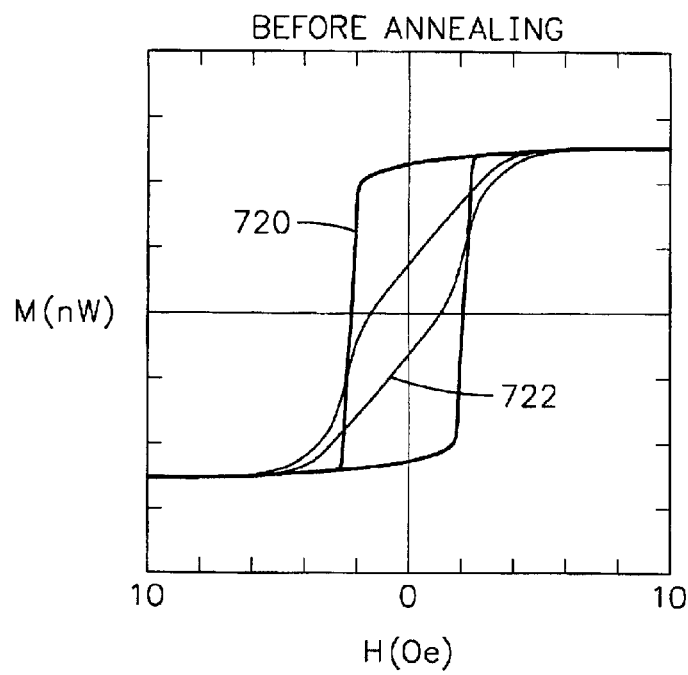
FIG. 20A shows hard axis and easy axis M/H loops for the structure shown in FIG. 19.
Figure 20B:
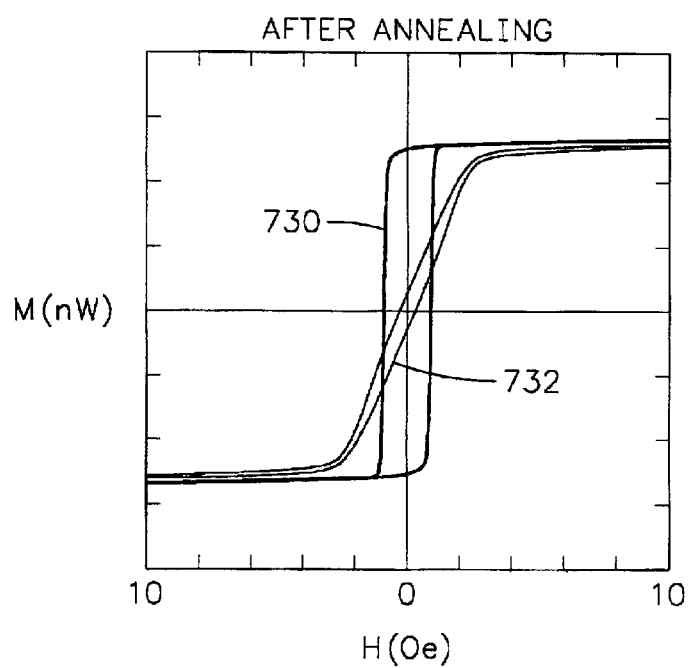
FIG. 20B shows hard axis and easy axis M/H loops for the structure in FIG. 19 after annealing.

Example 700, shown in FIG. 19, shows an exemplary free layer structure 701 located between a bottom layer 702 and first and second top layers 704 and 706. The free layer structure 700 has a middle layer 708 located between first and second outside layers 710 and 712. The thicknesses and materials of the layers are 31 Å of copper (Cu) for the bottom layer 702, 5 Å of cobalt (Co) for the first outside layer 710, 54 Å of nickel iron (NiFe) for the middle layer 708, 5 Å of cobalt (Co) for the second outside layer 712, 10 Å of copper (Cu) for the first top layer 704 and 50 Å of tantalum (Ta) for the second top layer 706. All of the layers of Example 700 were ion beam sputter deposited with sputtering angles α=40° and β=0°. FIG. 20A shows easy axis and hard axis loops 720 and 722 in a M/H graph of Example 700 before annealing. The openness of the hard axis loop 722 shows considerable hysteresis when Example 700 is subjected to applied fields. Hard axis coercivity $H_{CH}$, which quantifies hysteresis, is measured from the origin of the x and y axes to the intersection of the hard axis loop with the x axis. Example 700 was then subjected to annealing at a temperature of 220° C. for a period of 6 hours which simulates hard baking the photoresist layers in the write head to form the first, second and third insulation layers 86, 88 and 90 in FIG. 6. The easy and hard axis loops after annealing are shown at 730 and 732 in FIG. 20B. It can be seen that the annealing reduced the hard axis coercivity $H_{CH}$ of Example 700, but an openness in the hard axis loop 732 still remained which will cause Barkhausen noise when Example 700 is used in a read head.

EXAMPLE 5

Figure 21:
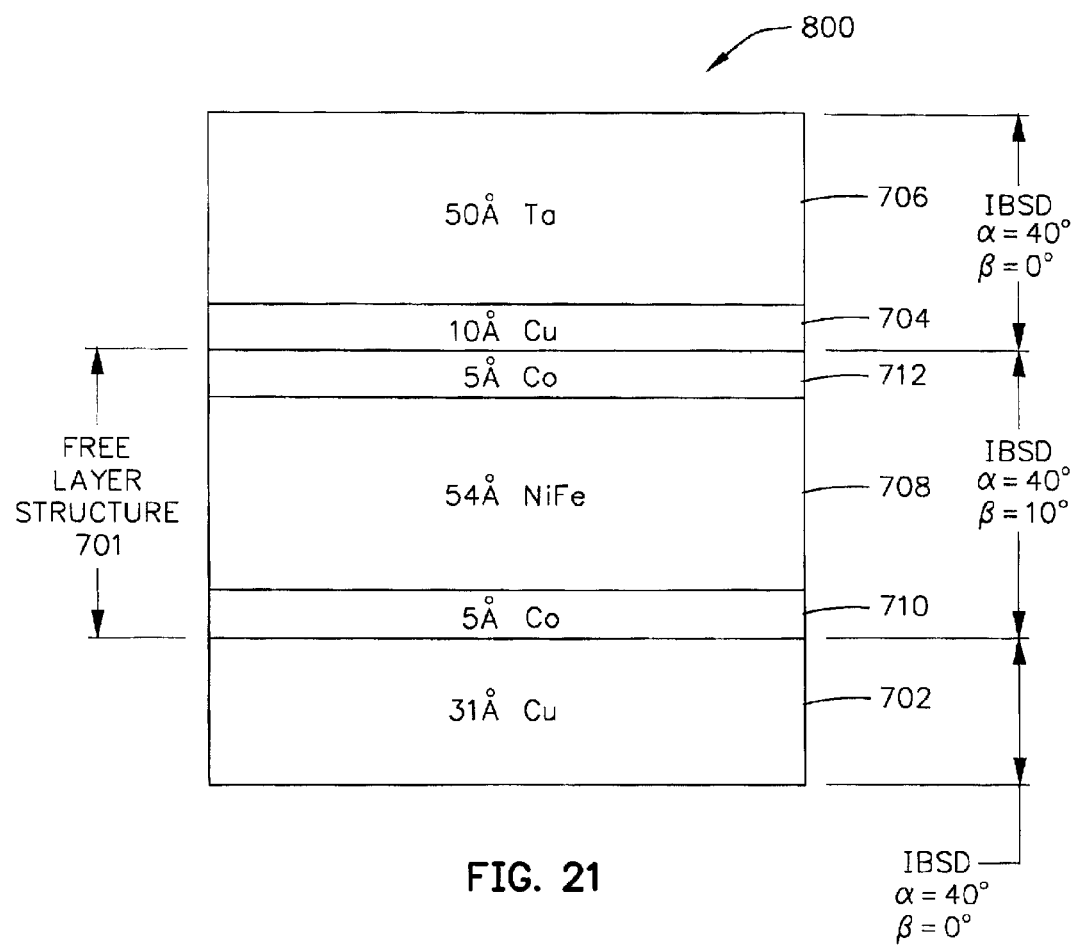
FIG. 21 is the same as FIG. 19 except oblique ion beam sputter deposition has been employed to construct the free layer structure at a sputtering angle of 10°.
Figure 22A:
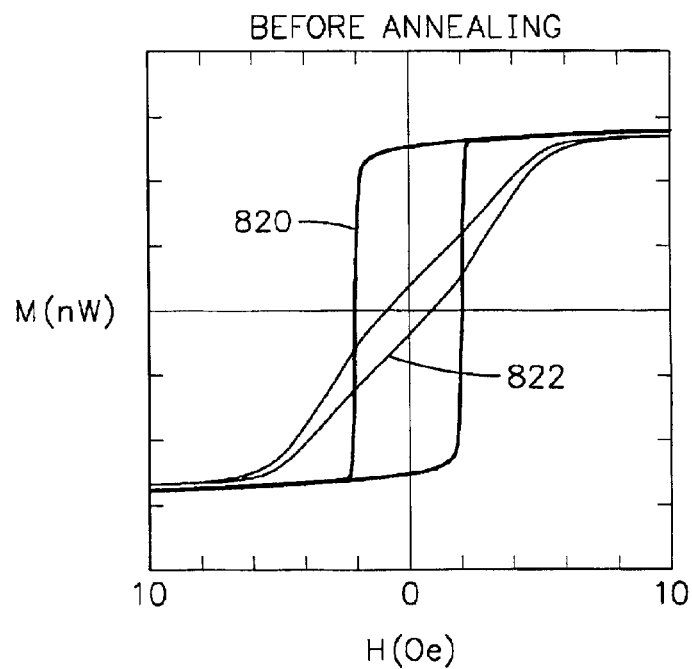
FIG. 22A shows hard axis and easy axis M/H loops for the structure of FIG. 21 before annealing.
Figure 22B:
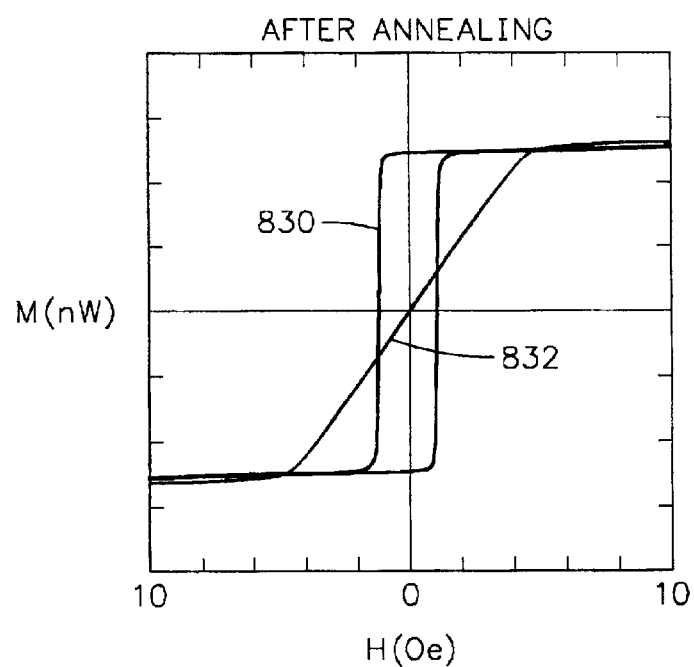
FIG. 22B shows a hard axis curve and easy axis M/H loops for the structure of FIG. 21 after annealing.

Example 800, shown in FIG. 21, is the same as Example 700, shown in FIG. 19, except the layers 710, 708 and 712 of the free layer structure have been obliquely ion beam sputter deposited at angles α=40° and β=10°. The easy axis and hard axis loops 820 and 822 for the Example 800 before annealing are shown in FIG. 22A. It can be seen that the hard axis loop 822 has an openness which results in hard axis coercivity $H_{CH}$ which will produce Barkhausen noise. The Example 800 was then subjected to the aforementioned annealing at 220° C. for a period of 6 hours. The easy axis and the hard axis loops 830 and 832 after annealing is shown in FIG. 22B. It can be seen that there is no openness in the hard axis loop 832 which means that the hard axis coercivity $H_{CH}$ is substantially zero. Accordingly, Example 800 shows a considerable improvement over Example 700.

EXAMPLE 6

Figure 23:
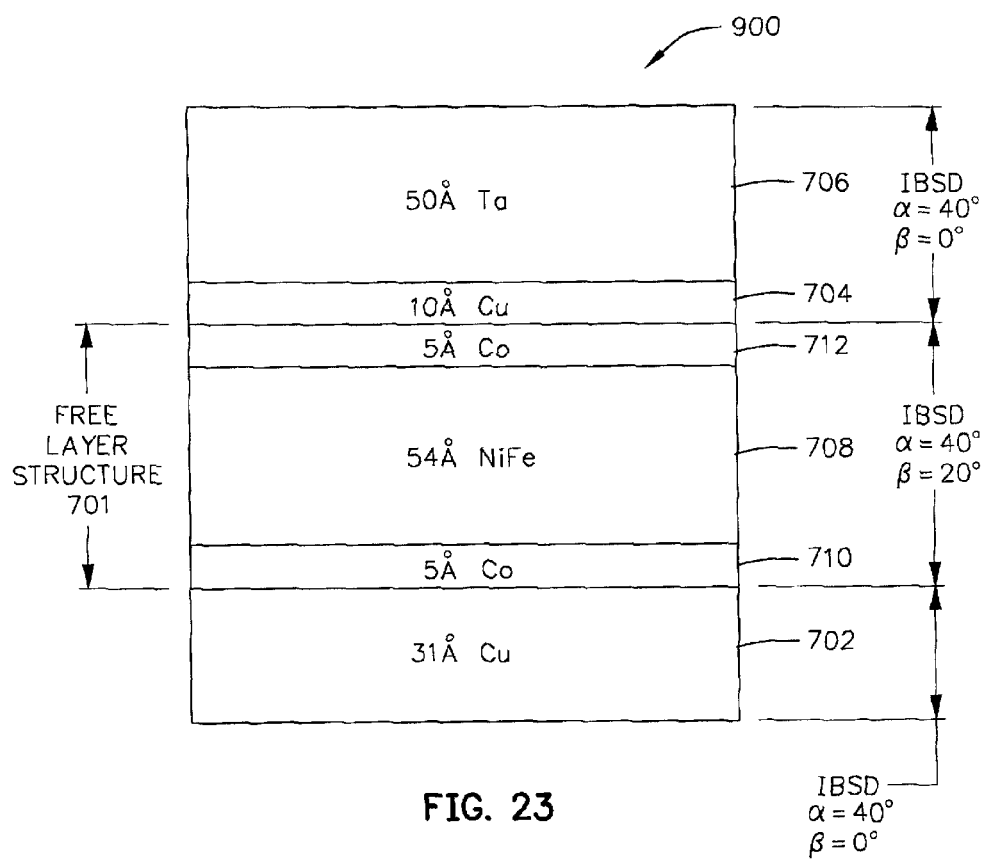
FIG. 23 is the same as FIG. 21 except oblique ion beam sputter deposition has been employed to form the free layer structure with a sputtering angle of 20°.
Figure 24A:
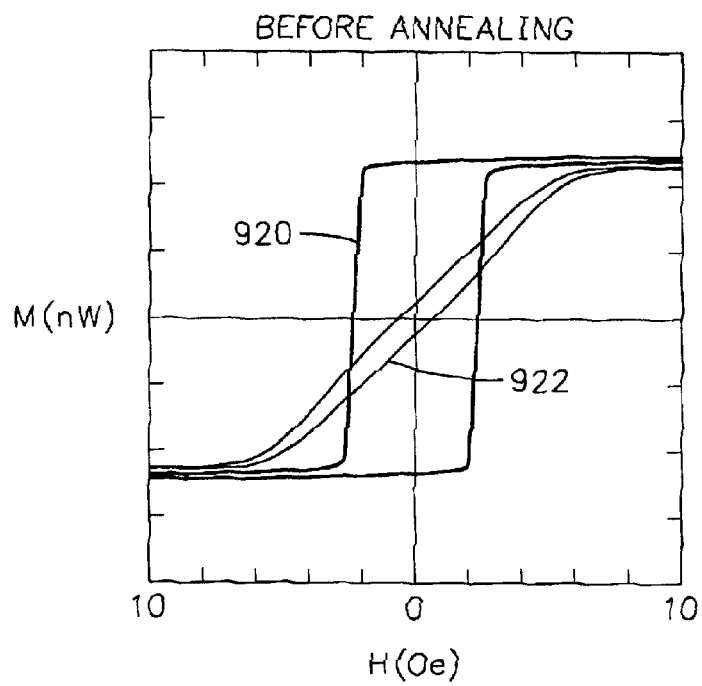
FIG. 24A shows hard axis and easy axis M/H loops for the structure in FIG. 23 before annealing.
Figure 24B:
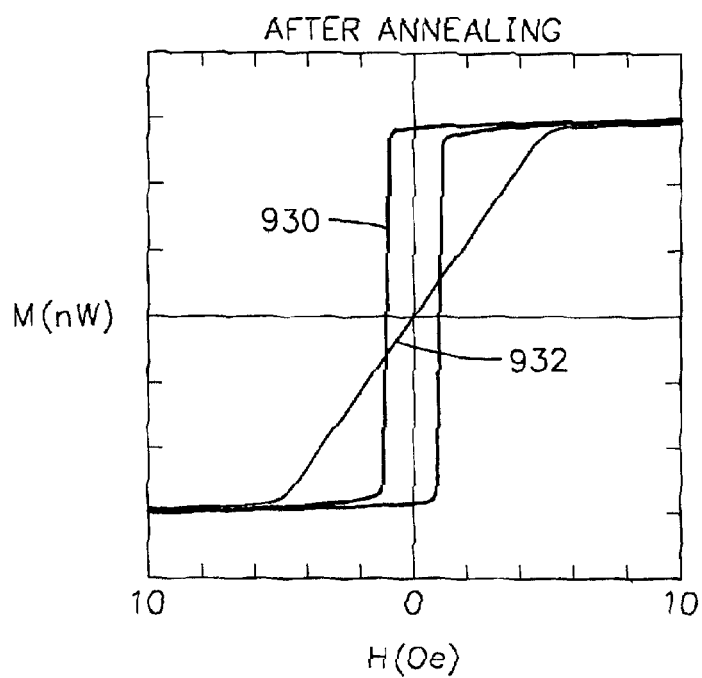
FIG. 24B shows a hard axis curve and easy axis M/H loops for the structure shown in FIG. 23 after annealing.

Example 900, shown in FIG. 23, is the same as Example 800 shown in FIG. 21 except the layers 710, 708 and 712 of the free layer structure were obliquely ion beam sputtered at angles α=40° and β=20°. The easy axis and hard axis loops 920 and 922 before annealing are shown in FIG. 24A. It can be seen that there is an openness to the hard axis loop 922 which will cause Barkhausen noise. FIG. 24B shows an easy axis loop 930 and a hard axis loop 932 which is along the hard axis after annealing at 220° C. for a period of 6 hours. It can be seen that there is no opening in the hard axis loop 932 which substantially eliminates Barkhausen noise.

EXAMPLE 7

Figure 25:
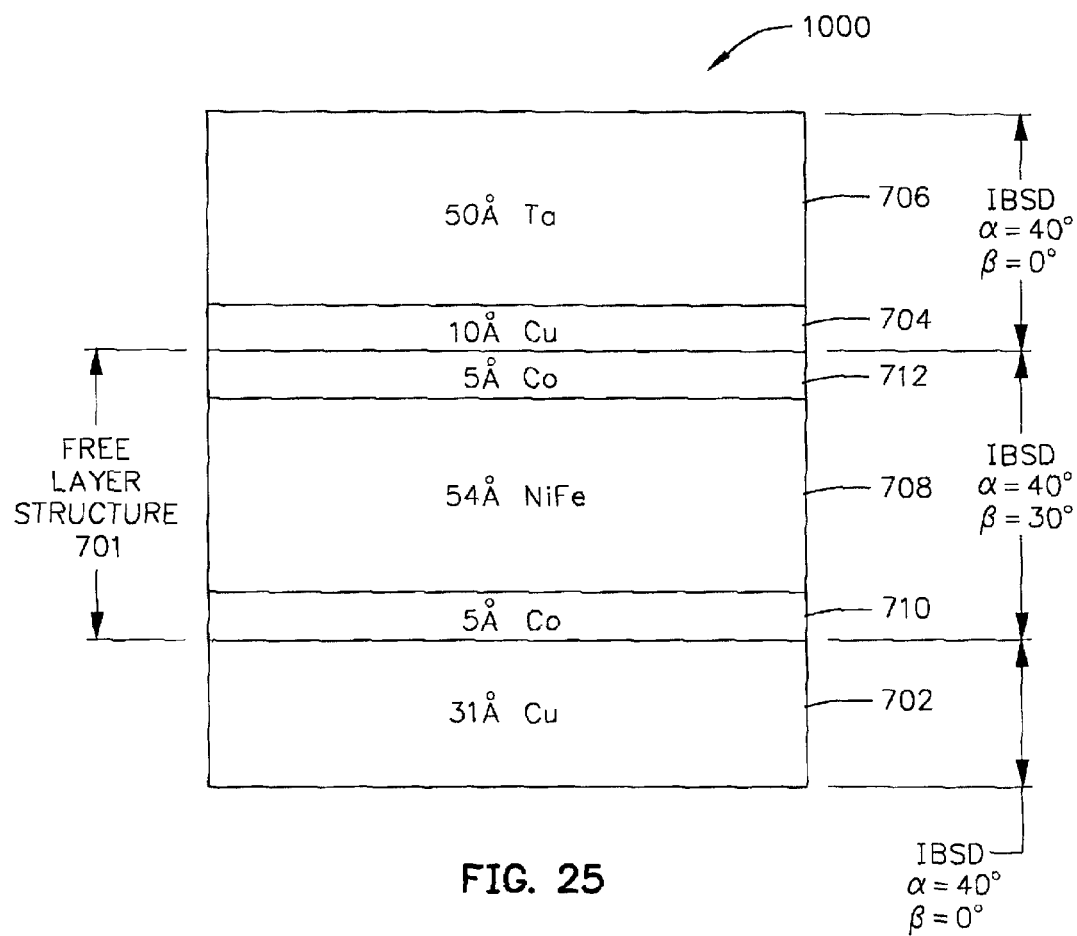
FIG. 25 is the same as FIG. 23 except the free layer structure has been oblique ion beam sputter deposited at an angle of 30°.
Figure 26A:
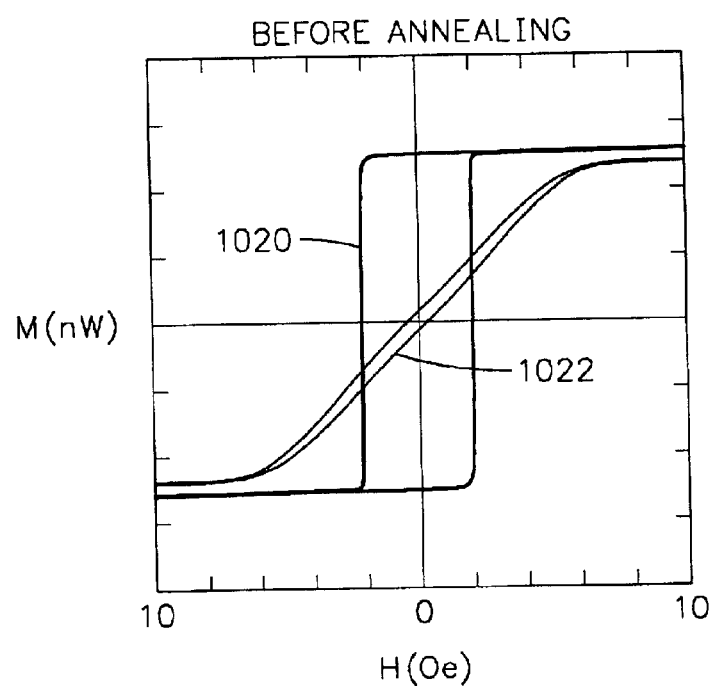
FIG. 26A shows hard axis and easy axis M/H loops for the structure in FIG. 25 before annealing.
Figure 26B:
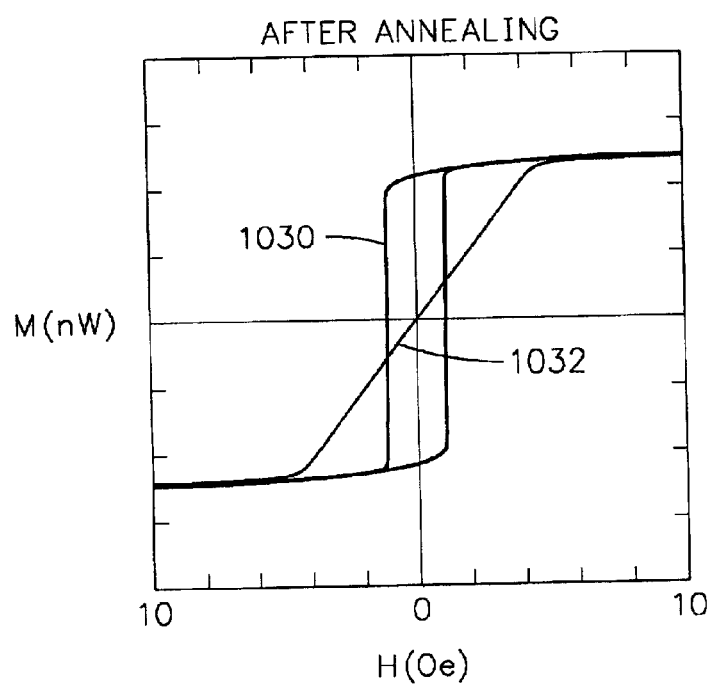
FIG. 26B shows hard axis and easy axis M/H loops for the structure in FIG. 25 after annealing.

Example 1000 in FIG. 25 is the same as the Example 900 in FIG. 23 except the layers 710, 708 and 712 of the free layer structure were obliquely ion beam sputtered at angles α=40° and β=30°. The easy axis and hard axis loops 1020 and 1022 before annealing are shown in FIG. 26A. It can be seen that there is a slight openness in the hard axis loop 1022. FIG. 26B shows an easy axis loop 1030 and a hard axis loop 1032 after annealing at a temperature of 220° C. for a period of 6 hours. It can be seen that there is no openness in the hard is loop 1032 which means that Barkhausen noise has been eliminated.

From the above examples it can be seen that a sputtering angle β between 10° to 30° results in an improved free layer structure which employs a nickel iron (NiFe) layer between first and second cobalt (Co) layers. It should be understood that the invention can be practiced with oblique ion beam sputtering angles β other than 10° to 30° and still obtain improvements in the performance of the free layer structure. Further, the invention is not limited to employing two cobalt layers but, optionally, may employ cobalt based layers, such as cobalt iron (CoFe), with only one cobalt based layer being employed between the nickel iron (NiFe) layer and a copper (Cu) spacer layer or an additional cobalt based layer between the nickel iron (NiFe) layer and a capping layer.

Figure 27A:
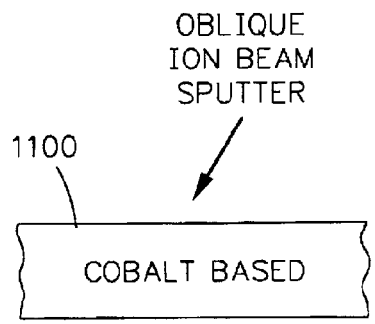
FIG. 27A shows a cross-section of a cobalt based layer being obliquely ion beam sputtered.
Figure 27B:
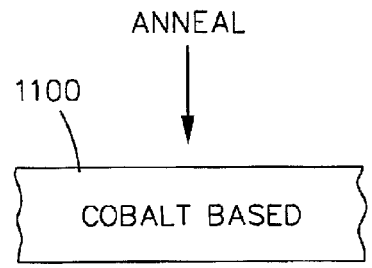
FIG. 27B is the same as FIG. 27A except the cobalt based layer is annealed.

FIGS. 27A and 27B illustrate a broader concept of the present invention wherein a single cobalt based layer, such as cobalt (Co) or cobalt iron (CoFe), is obliquely ion beam sputtered as shown in FIG. 27A at sputtering angles α and/or β greater than 0 but less than 90°. This layer can be used for other electronic devices such as random access memory (RAM) devices. Optionally, the cobalt based layer 1100 may be annealed at a temperature above 100° C. for a period of time as shown in FIG. 27B. As discussed hereinabove the oblique ion beam sputtering shown in FIG. 27A will improve the hard axis coercivity $H_{CH}$ of the cobalt based layer 100 which is still further improved or eliminated by employing the annealing step shown in FIG. 27B.

Figure 28:
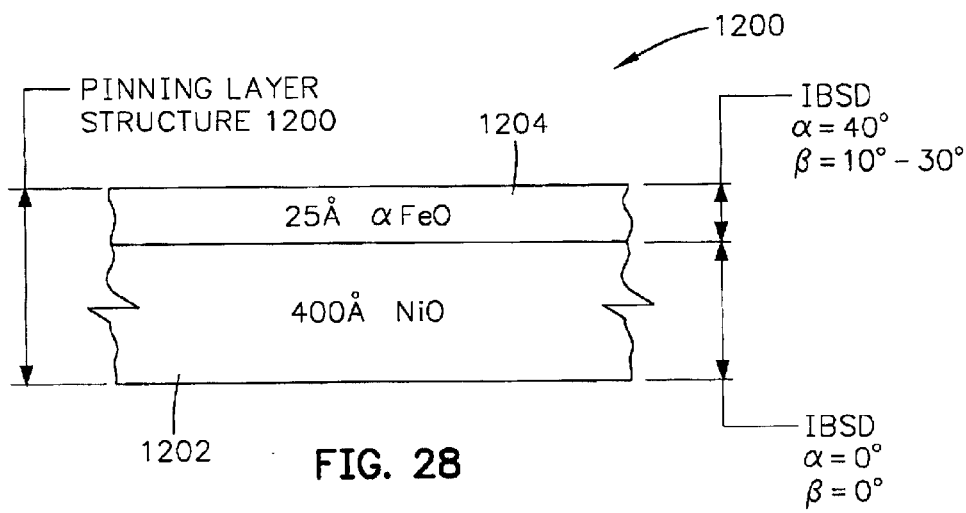
FIG. 28 shows a cross-section of a pinning layer structure employing a nickel oxide (NiO) layer and an alpha a iron oxide layer, wherein the alpha α iron oxide layer is obliquely ion beam sputter deposited at an angle of 10° to 30°.
Figure 29:
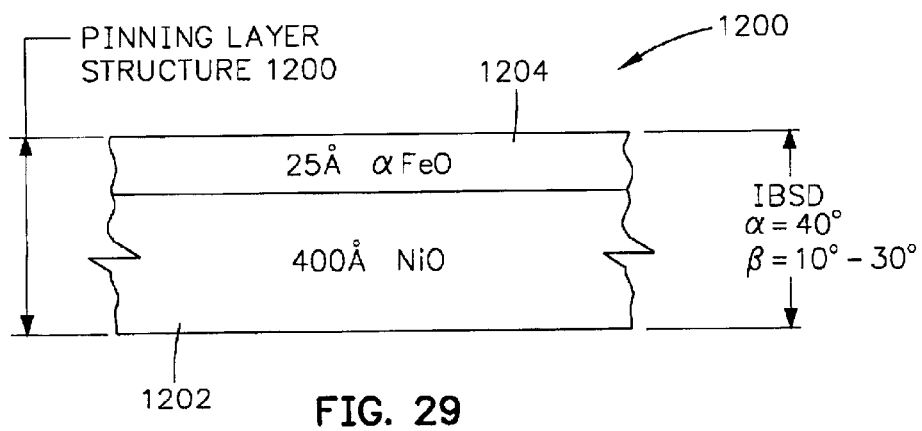
FIG. 29 is the same as FIG. 28 except both layers are obliquely ion beam sputtered at an angle of 10° to 30°.

FIG. 28 shows a pinning layer structure 1200 which can be substituted for the pinning layer structure 416 in FIG. 16 in the spin valve sensor. The structure 1200 includes first and second layers 1202 and 1204 wherein the first layer 1202 may be 400 Å of nickel oxide (NiO) and the second layer may be 25 Å of alpha iron oxide (αFeO). In this embodiment the layer 1202 is ion beam sputter deposited by the prior art sputtering system in FIG. 12 and the layer 1204 is obliquely ion beam sputter deposited at sputtering angles α and/or β greater than 0. It has been found that this process of fabrication results in a pinning layer structure 1200 which has an improved blocking temperature distribution. FIG. 29 is the same as FIG. 28 except both layers 1202 and 1204 have been ion beam sputter deposited at sputtering angles α and/or β greater than 0. The pinning layer structure in FIG. 27 has a still further improved blocking temperature distribution which will improve the magnetic stability of the spin valve sensor.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A method of making a magnetic read head, which includes a spin valve sensor, comprising the steps of:

a making of the spin valve sensor comprising the steps of:
forming a free layer structure that has a magnetic moment and an easy axis;
forming a ferromagnetic pinned layer structure that has a magnetic moment;
forming a pinning layer exchange coupled to the pinned layer structure for pinning the magnetic moment of the pinned layer structure;
forming a nonmagnetic conductive spacer layer between the free layer structure and the pinned layer structure;
forming the free layer structure by obliquely ion beam sputtering at least one cobalt or cobalt based layer in the presence of a magnetic field oriented in a direction of said easy axis; and
the oblique ion beam sputtering being at angles α=40° and β=10°–30°, wherein angles α and β form first and second planes respectively which are orthogonal with respect to one another.

2. A method as claimed in claim 1 further comprising the steps of:

forming the free layer structure with a nickel iron based layer that interfaces the cobalt or cobalt based layer; and said forming of the cobalt or cobalt based layer so that it interfaces the spacer layer.

3. A method as claimed in claim 2 further comprising the step of:

after said oblique ion beam sputtering in the presence of said field oriented in said direction of the easy axis, further forming said at least one cobalt or cobalt based layer by annealing said at least one cobalt or cobalt based layer.

4. A method as claimed in claim 2 wherein said cobalt based layer is formed of cobalt iron (CoFe).

5. A method as claimed in claim 4 wherein said annealing is at a temperature from 150° C. to 270° C.

6. A method as claimed in claim 1 wherein the forming of the spacer layer includes oblique ion beam sputtering copper at angles $\alpha=40°$ and $\beta=10°–30°$ with angles $\alpha$ and $\beta$ being orthogonal.

7. A method of making a magnetic read head, which includes a spin valve sensor comprising the steps of:
  a making of the spin valve sensor comprising the steps of:
    forming a free layer structure that has a magnetic moment and an easy axis;
    forming a ferromagnetic pinned layer structure that has a magnetic moment;
    forming a pinning layer exchange coupled to the pinned layer structure for pinning the magnetic moment of the pinned layer structure;
    forming a nonmagnetic conductive spacer layer between the free layer structure and the pinned layer structure;
  forming the free layer structure by obliquely ion beam sputtering at least one cobalt or cobalt based layer in the presence of a magnetic field oriented in a direction of said easy axis;
  the pinning layer structure being formed by forming a nickel oxide (NiO) layer and an alpha iron oxide ($\alpha$FeO) layer wherein each of the nickel oxide (NiO) layer and the alpha iron oxide ($\alpha$FeO) layer has been formed by oblique ion beam sputtering at angles $\alpha$ and $\beta$ wherein angles $\alpha$ and $\beta$ form first and second planes respectively which are orthogonal with respect to one another.

8. A method of making a magnetic read head, which includes a spin valve sensor, comprising the steps of:
  forming the spin valve sensor as follows:
    forming a ferromagnetic pinned layer structure that has a magnetic moment;
    forming a pinning layer exchange coupled to the pinned layer structure for pinning the magnetic moment of the pinned layer structure;
    forming a nonmagnetic conductive spacer layer between the free layer structure and the pinned layer structure; and
    forming the pinning layer structure of a nickel oxide (NiO) layer and an alpha iron oxide ($\alpha$FeO) layer wherein at least one of the nickel oxide (NiO) layer and the alpha iron oxide ($\alpha$FeO) layer has been obliquely ion beam sputtered at angles $\alpha$ and $\beta$ wherein angles $\alpha$ and $\beta$ form first and second planes respectively which are orthogonal with respect to one another.

9. A method of making a magnetic read head, which includes a spin valve sensor, comprising:
  a making of the spin valve sensor including the steps of:
    forming a free layer structure that has a magnetic moment and an easy axis;
    forming a ferromagnetic pinned layer structure that has a magnetic moment;
    forming a pinning layer exchange coupled to the pinned layer structure for pinning the magnetic moment of the pinned layer structure;
    forming a nonmagnetic conductive spacer layer between the free layer structure and the pinned layer structure;
  a making the free layer structure including the steps of:
    obliquely ion beam sputtering first and second cobalt or cobalt based layers and a nickel iron based layer in the presence of a magnetic field oriented in a direction of said easy axis with the first and second cobalt or cobalt based layers interfacing the spacer layer and a cap layer respectively and the nickel iron based layer being located between and interfacing the first and second cobalt or cobalt based layers;
    the oblique ion beam sputtering being at angles $\alpha=40°$ and $\beta=10°–30°$ wherein angles $\alpha$ and $\beta$ form first and second planes respectively which are orthogonal with respect to one another; and
    after said oblique ion beam sputtering in the presence of said field oriented in said direction of the easy axis, annealing each of the cobalt or cobalt based layers and the nickel iron based layer.

10. A method as claimed in claim 9 including:
  forming nonmagnetic nonconductive first and second read gap layers;
  forming the spin valve sensor between the first and second read gap layers;
  forming ferromagnetic first and second shield layers; and
  forming the first and second read gap layers between the first and second shield layers.

11. A method as claimed in claim 10 wherein a forming of the pinned layer structure comprises the steps of:
  forming ferromagnetic first and second antiparallel (AP) pinned layers with the first AP layer interfacing the pinning layer; and
  forming an antiparallel (AP) coupling layer between the first and second AP layers.

12. A method as claimed in claim 11 wherein the step of oblique ion beam sputtering includes the steps of:
  providing a sputtering chamber;
  providing a nonmagnetic conductive target in the sputtering chamber that has a nominal planar surface;
  positioning a substrate in the chamber that has a nominal planar surface at angles $\alpha$ and $\beta$ to the nominal planar surface of the target;
  providing an ion beam gun in the chamber for bombarding the target with ions which causes ions of the material to be sputtered from the target and deposited on the substrate to form said cobalt or cobalt based layers; and
  angle $\alpha=40°$ and angle $\beta=10°–30°$ wherein angles $\alpha$ and $\beta$ form first and second planes respectively which are orthogonal with respect to one another and are angles between the nominal surface planes of the target and the substrate.

13. A method as claimed in claim 9 wherein the forming of the spacer layer includes oblique ion beam sputtering copper at angles $\alpha=40°$ and $\beta=10°–30°$ with angles $\alpha$ and $\beta$ being orthogonal.

14. A method of making magnetic head assembly that includes a write head and a read head, comprising the steps of:
  a making of the write head including:
    forming ferromagnetic first and second pole piece layers in pole tip, yoke and back gap regions wherein the yoke region is located between the pole tip and back gap regions;
    forming a nonmagnetic nonconductive write gap layer between the first and second pole piece layers in the pole tip region;

forming an insulation stack with at least one coil layer embedded therein between the first and second pole piece layers in the yoke region; and connecting the first and second pole piece layers at said back gap region, and making the read head as follows:

forming a spin valve sensor and first and second nonmagnetic first and second read gap layers with the spin valve sensor located between the first and second read gap layers;

forming a ferromagnetic first shield layer; and forming the first and second read gap layers between the first shield layer and the first pole piece layer; and a making of the spin valve sensor comprising the steps of:

forming a free layer structure that has a magnetic moment and an easy axis;

forming a ferromagnetic pinned layer structure that has a magnetic moment;

forming a pinning layer exchange coupled to the pinned layer structure for pinning the magnetic moment of the pinned layer structure;

forming a nonmagnetic conductive spacer layer between the free layer structure and the pinned layer structure;

a making of the free layer structure including the step of:

obliquely ion beam sputtering first and second cobalt or cobalt based layers and a nickel iron based layer in the presence of a magnetic field oriented in a direction of said easy axis with the first and second cobalt or cobalt based layers interfacing the spacer layer structure and a gap layer respectively and the nickel iron based layer being located between and interfacing the first and second cobalt or cobalt based layers;

the oblique ion beam sputtering being at angles $\alpha=40°$ and $\beta=10°-30°$ wherein angles $\alpha$ and $\beta$ form first and second planes respectively which are orthogonal with respect to one another; and after said oblique ion beam sputtering in the presence of said field oriented in said direction of the easy axis, annealing each of the cobalt or cobalt based layers and the nickel iron based layer.

15. A method as described in claim 14 including:

forming a ferromagnetic second shield layer;

forming a nonmagnetic isolation layer between the second shield layer and the first pole piece layer.

16. A method as claimed in claim 14 wherein a forming of the pinned layer structure comprises the steps of:

forming ferromagnetic first and second antiparallel (AP) pinned layers with the first AP pinned layer interfacing the pinning layer; and forming an antiparallel (AP) coupling layer located between the first and second AP layers.

17. A method as claimed in claim 16 wherein the step of oblique ion beam sputtering includes the steps of:

providing a sputtering chamber;

providing a nonmagnetic conductive target in the sputtering chamber that has a nominal planar surface;

positioning a substrate in the chamber that has a nominal planar surface at an angle to the nominal planar surface of the target;

providing an ion beam gun in the chamber for bombarding the target with ions which causes ions of the material to be sputtered from the target and deposited on the substrate to form said cobalt or cobalt based layers.

18. A method as claimed in claim 14 wherein the forming of the spacer layer includes oblique ion beam sputtering copper at angles $\alpha=40°$ and $\beta=10°-30°$ with angles $\alpha$ and $\beta$ being orthogonal.

19. A method of making a magnetic layer and/or an antiferromagnetic (AFM) layer for an electrical device comprising the steps of:

obliquely ion beam sputtering at least one material layer from a target onto a substrate to form said magnetic layer and/or antiferromagnetic (AFM) layer;

the oblique ion beam sputtering being at angles $\alpha$ and $\beta$ wherein each angle $\alpha$ and $\beta$ is acute and wherein the angles $\alpha$ and $\beta$ form first and second planes respectively which are orthogonal with respect to each other.

20. A method as claimed in claim 19 wherein said at least one material layer is a nickel iron film and first and second cobalt based films with the nickel iron layer being located between the first and second cobalt based films for forming said magnetic layer.

21. A method as claimed in claim 19 wherein the electrical device is a magnetic head assembly and further comprises the steps of:

said at least one material layer being a ferromagnetic free layer;

a ferromagnetic pinned layer;

a nonmagnetic spacer layer located between the free and pinned layers; and the pinned and spacer layers being ion beam sputtered at only said angle $\alpha$.

22. A method of making a magnetic layer and/or an antiferromagnetic (AFM) layer for an electrical device comprising the steps of:

obliquely ion beam sputtering at least one material layer from a target onto a substrate to form said magnetic layer and/or antiferromagnetic (AFM) layer;

the oblique ion beam sputtering being at angles $\alpha$ and $\beta$ wherein each angle $\alpha$ and $\beta$ is acute and wherein the angles $\alpha$ and $\beta$ form first and second planes respectively which are orthogonal with respect to each other; and the angle $\beta$ being 10° to 30°.

23. A method of making a magnetic layer and/or an antiferromagnetic (AFM) layer for an electrical device comprising the steps of:

obliquely ion beam sputtering at least one material layer from a target onto a substrate to form said magnetic layer and/or antiferromagnetic (AFM) layer;

the oblique ion beam sputtering being at angles $\alpha$ and $\beta$ wherein each angle $\alpha$ and $\beta$ is acute and wherein the angles $\alpha$ and $\beta$ form first and second planes respectively which are orthogonal with respect to each other; and the angle $\beta$ being 20° and the angle $\alpha$ being 40°.

24. A method of making a magnetic layer and/or an antiferromagnetic (AFM) layer for an electrical device comprising the steps of:

obliquely ion beam sputtering at least one material layer from a target onto a substrate to form said magnetic layer and/or antiferromagnetic (AFM) layer;

the oblique ion beam sputtering being at angles $\alpha$ and $\beta$ wherein each angle $\alpha$ and $\beta$ is acute and wherein the angles $\alpha$ and $\beta$ form first and second planes respectively which are orthogonal with respect to each other; and the angle $\beta$ being 30° and the angle $\alpha$ being 40°.

25. A method of making a magnetic layer and/or an antiferromagnetic (AFM) layer for an electrical device comprising the steps of:

obliquely ion beam sputtering at least one material layer from a target onto a substrate to form said magnetic layer and/or antiferromagnetic (AFM) layer;

the oblique ion beam sputtering being at angles α and β wherein each angle α and β is acute and wherein the angles α and β form first and second planes respectively which are orthogonal with respect to each other;

said at least one material layer being a nickel iron film and first and second cobalt based films with the nickel iron layer being located between the first and second cobalt based films for forming said magnetic layer; and a second material layer comprising a nickel oxide film and an α phase iron oxide film that interface one another being obliquely ion beam sputtered at said angles α and β for forming said antiferromagnetic layer.

26. A method as claimed in claim 25 wherein for each of said magnetic and AFM layers the angle β is 10° to 30°.

27. A method as claimed in claim 26 wherein for said magnetic layer the angle β is 20° and the angle α is 40°.

28. A method of making a magnetic layer and/or an antiferromagnetic (AFM) layer for an electrical device comprising the steps of:

obliquely ion beam sputtering at least one material layer from a target onto a substrate to form said magnetic layer and/or antiferromagnetic (AFM) layer;

the oblique ion beam sputtering being at angles α and β wherein each angle α and β is acute and wherein the angles α and β form first and second planes respectively which are orthogonal with respect to each other;

said at least one material layer being a ferromagnetic free layer;

forming a ferromagnetic pinned layer;

forming a nonmagnetic spacer layer between the free and pinned layers; and the pinned and spacer layers being ion beam sputtered at an angle α which is acute and at an angle β which is 10° to 30°.

29. A method as claimed in claim 28 wherein the free layer has a magnetic moment with an easy axis and the oblique sputtering of the free layer is done in the presence of a magnetic field oriented parallel to said easy axis.

30. A method as claimed in claim 29 wherein after oblique sputtering the free layer the free layer is annealed at a temperature from 150° C. to 270° C. in the presence of said field oriented parallel to said easy axis.

31. A method as claimed in claim 30 wherein for the free layer the angle β is 20° and the angle α is 40°.

32. A method as claimed in claim 31 wherein for the pinned and spacer layers angle α is 40°.

33. A method as claimed in claim 32 further including the steps of:

forming said antiferromagnetic (AFM) layer interfacing the pinned layer wherein the AFM layer includes a nickel oxide film and an α phase iron oxide film that interface one another; and ion beam sputtering the nickel oxide film and the α phase iron oxide film at angles α and β wherein each angle α and β are acute and wherein the angles α and β form first and second planes respectively which are orthogonal with respect to one another.

34. A method as claimed in claim 33 wherein for the AFM layer the angle α is 40° and angle β is 10°–30°.

35. A method of ion beam sputtering at least one layer comprising the steps of:

providing a substrate with a first planar surface;

providing at least one target with a second planar surface wherein the target is composed of a desired material for said layer;

positioning the planar surfaces at angles α and β with respect to one another wherein angle α forms a first plane intersecting the first and second planar surfaces and angle β forms a second plane intersecting the first and second planar surfaces as well as the first plane with the intersection of the first and second planes being orthogonal with respect to each other; and ion beam sputtering the target so that said material is sputtered from the target onto said substrate to form said layer.

36. A method as claimed in claim 35 wherein a central ion beam lies within said first plane.

37. A method as claimed in claim 36 wherein said at least one layer is a nickel iron film and first and second cobalt based films with the nickel iron film being located between the first and second cobalt based films for forming said layer.

38. A method as claimed in claim 36 wherein said method forms a magnetic head assembly further comprising:

said at least one layer being a ferromagnetic free layer;

forming a ferromagnetic pinned layer;

forming a nonmagnetic spacer layer between the free and pinned layers; and the pinned and spacer layers being ion beam sputtered at only said angle α.

39. A method as claimed in claim 38 wherein for the free layer the angle β is 10° to 30°.

40. A method as claimed in claim 39 wherein the free layer has a magnetic moment with an easy axis and the oblique sputtering of the free layer is done in the presence of a magnetic field oriented parallel to said easy axis.

41. A method as claimed in claim 40 wherein after oblique sputtering the free layer the free layer is annealed at a temperature from 150° C. to 270° C. in the presence of said field oriented parallel to said easy axis.

42. A method as claimed in claim 41 wherein for the free layer the angle β is 20° and the angle α is 40°.

43. A method as claimed in claim 42 wherein for the pinned and spacer layers angle α is 40°.

44. A method as claimed in claim 43 further comprising:

forming an antiferromagnetic (AFM) layer interfacing the pinned layer wherein the AFM layer includes a nickel oxide film and an α phase iron oxide film that interface one another; and ion beam sputtering the nickel oxide film and the α phase iron oxide film at angles α and β wherein each angle α and β are acute and wherein the angles α and β form first and second planes respectively which are orthogonal with respect to one another.

45. A method as claimed in claim 44 wherein for the AFM layer the angle α is 40° and angle β is 10°–30°.

46. A method of ion beam sputtering at least one layer comprising the steps of:

providing a substrate with first planar surface;

providing at least one target with a second planar surface wherein the target is composed of a desired material for said layer;

positioning the planar surfaces at angles α and β with respect to one another wherein angle α forms a first plane intersecting the first and second planar surfaces and angle β forms a second plane intersecting the first and second planar surfaces as well as the first plane with the intersection of the first and second planes being orthogonal with respect to each other; and ion beam sputtering the target so that said material is sputtered from the target onto said substrate to form said layer;

a central ion beam lying within said first plane; and the angle β being 10° to 30°.

47. A method of ion beam sputtering at least one layer comprising the steps of:

providing a substrate with a first planar surface;

providing at least one target with a second planar surface wherein the target is composed of a desired material for said layer;

positioning the planar surfaces at angles α and β with respect to one another wherein angle α forms a first plane intersecting the first and second planar surfaces and angle β forms a second plane intersecting the first and second planar surfaces as well as the first plane with the intersection of the first and second planes being orthogonal with respect to each other; and ion beam sputtering the target so that said material is sputtered from the target onto said substrate to form said layer;

a central ion beam lying within said first plane; and the angle β being 20° and the angle α being 40°.

48. A method of ion beam sputtering at least one layer comprising the steps of:

providing a substrate with a first planar surface;

providing at least one target with a second planar surface wherein the target is composed of a desired material for said layer;

positioning the planar surfaces at angles α and β with respect to one another wherein angle α forms a first plane intersecting the first and second planar surfaces and angle β forms a second plane intersecting the first and second planar surfaces as well as the first plane with the intersection of the first and second planes being orthogonal with respect to each other; and ion beam sputtering the target so that said material is sputtered from the target onto said substrate to form said layer;

a central ion beam lying within said first plane; and the angle β being 30° and the angle α being 40°.

49. A method of ion beam sputtering at least one layer comprising the steps of:

providing a substrate with a first planar surface;

providing at least one target with a second planar surface wherein the target is composed of a desired material for said layer;

positioning the planar surfaces at angles α and β with respect to one another wherein angle α forms a first plane intersecting the first and second planar surfaces and angle β forms a second plane intersecting the first and second planar surfaces as well as the first plane with the intersection of the first and second planes being orthogonal with respect to each other; and ion beam sputtering the target so that said material is sputtered from the target onto said substrate to form said layer;

a central ion beam lying within said first plane;

said at least one layer being a nickel iron film and first and second cobalt based films with the nickel iron film being located between the first and second cobalt based films for forming said layer; and a second layer comprising a nickel oxide film and an α phase iron oxide film that interface one another being obliquely ion beam sputtered at said angles α and β for forming another layer.

50. A method as claimed in claim 49 wherein for each of said layer and said other layer the angle β is 10° to 30°.

51. A method as claimed in claim 50 wherein for said layer the angle β is 20° and the angle α is 40°.

* * * * *